US012217523B2

(12) United States Patent
Chatzistamatiou et al.

(10) Patent No.: US 12,217,523 B2
(45) Date of Patent: Feb. 4, 2025

(54) LIST AND TABULAR DATA EXTRACTION SYSTEM AND METHOD

(71) Applicant: Accenture Global Solutions Limited, Dublin (IE)

(72) Inventors: Andre Chatzistamatiou, Essen (DE); Florin Cremenescu, Biot (FR); Yizhen Dai, The Hague (NL); Ludo Gerardus Wilhelmus van Alst, Nijmegen (NL)

(73) Assignee: Accenture Global Solutions Limited, Dublin (IE)

( * ) Notice: Subject to any disclaimer, the term of this patent is extended or adjusted under 35 U.S.C. 154(b) by 375 days.

(21) Appl. No.: 17/898,193

(22) Filed: Aug. 29, 2022

(65) Prior Publication Data

US 2023/0410543 A1      Dec. 21, 2023

(30) Foreign Application Priority Data

Jun. 14, 2022   (EP) .................................... 22305866

(51) Int. Cl.
*G06V 30/413*       (2022.01)
*G06F 16/906*       (2019.01)
(Continued)

(52) U.S. Cl.
CPC .......... *G06V 30/413* (2022.01); *G06F 16/906* (2019.01); *G06F 16/93* (2019.01); *G06F 18/20* (2023.01); *G06F 18/24* (2023.01); *G06F 40/106* (2020.01); *G06F 40/177* (2020.01); *G06F 40/258* (2020.01); *G06F 40/279* (2020.01); *G06F 40/30* (2020.01); *G06V 30/10* (2022.01);
(Continued)

(58) Field of Classification Search
CPC .... G06V 30/10; G06V 30/414; G06V 30/412; G06V 30/416; G06V 30/413; G06V 30/41; G06V 30/153; G06V 10/764; G06V 30/19173; G06V 30/40; G06V 30/148; G06V 30/158; G06V 30/15; G06V 30/155; G06V 30/242; G16H 10/60; G06F 40/295; G06F 40/30; G06F 18/2431; G06F 18/24; G06F 18/20; G06F 18/00; G06F 18/241; G06F 16/93; G06F 40/279; G06F 16/906; G06F 40/177; G06F 16/5846; G06F 40/106; G06F 40/258

See application file for complete search history.

(56) References Cited

U.S. PATENT DOCUMENTS 11,501,549 B2 * 11/2022 Bade ................ G06V 30/19167
2021/0357633 A1 * 11/2021 Bade ..................... G06F 40/284
2022/0318497 A1 * 10/2022 Chalabi .................. G06N 5/041

OTHER PUBLICATIONS

Enendu, Predicting Semantic Labels of Text Regions in Heterogenous Document Images (Thesis), 2019 [retrieved Oct. 29, 2024], University of Twente, 70 pages. https://purl.utwente.nl/essays/79319 (Year: 2019).*

* cited by examiner

*Primary Examiner* — Henok Shiferaw
*Assistant Examiner* — Dennis Rosario

(57) ABSTRACT

A system and method for automating and improving tabular and list-based data extraction from a variety of document types is disclosed. The system and method detect and sort which documents include tables or lists, and performs row and column segmentation. In addition, the system and method apply Conditional Random Fields models to localize each table and semantic data understanding to map and export the extracted data to the desired format and arrangement.

20 Claims, 13 Drawing Sheets

(51) Int. Cl.
*G06F 16/93* (2019.01)
*G06F 18/20* (2023.01)
*G06F 18/24* (2023.01)
*G06F 40/106* (2020.01)
*G06F 40/177* (2020.01)
*G06F 40/258* (2020.01)
*G06F 40/279* (2020.01)
*G06F 40/30* (2020.01)
*G06V 30/10* (2022.01)
*G06V 30/146* (2022.01)
*G06V 30/148* (2022.01)
*G06V 30/162* (2022.01)
*G06V 30/164* (2022.01)
*G06V 30/412* (2022.01)
*G06V 30/414* (2022.01)

(52) U.S. Cl.
CPC ...... *G06V 30/1463* (2022.01); *G06V 30/1475* (2022.01); *G06V 30/153* (2022.01); *G06V 30/162* (2022.01); *G06V 30/164* (2022.01); *G06V 30/412* (2022.01); *G06V 30/414* (2022.01)

| Name | Haftlings Nr. | Geb. Dat. | m. w. | Ueberstell.- Dat. |
|---|---|---|---|---|
| Hechberg Simone | 7901 | 26. 1.26 | w. | 7.2.45 |
| Hoffmann Helene | 7911 | 18. 6.19 | " | " |
| Holser Gertrude | 7677 | 15. 5.22 | " | " |
| Helub Eva | 7573 | 22. 1.25 | " | " |
| Hern Magda | 11047 | 29. 5.24 | " | " |
| Huisman Sophie | 7338 | 22. 1.26 | " | " |
| Huss Anni | 7484 | 29. 4.02 | " | " |

| | | | | | | | |
|---|---|---|---|---|---|---|---|
| ROW 0 | | | Abschrift | | | | |
| ROW 1 | | ÜBERSTELLUNGSLISTE | | | Nr. 10 | | |
| ROW 2 | | | | KL Nr. | | | |
| ROW 3 | von KL Bergen-Belsen | | | 06 | | Woche 6 | |
| ROW 4 | an Buchenwald/Raguhn | | | 09 | | Blatt 7 | besteht aus 9 Blatt |
| | | | | | m. | | |
| ROW 5 | Haftlings Nr. | | | Geb. Dat. | w. | Ueberstellungs Datum | |
| ROW 6 an Jaera. | 8217 | | | 10. 7.05 | w. | 7.2.45 | |
| ROW 7 an Raiska. | 8220 | | | 5. 5.27 | " | " | |
| ROW 8 au Ninette | 7558 | | | 7. 5.21 | " | " | |
| ROW 9 ova. Aranka. | 7564 | | | 25. 6.10 | " | " | |
| ROW 10 a. Frans. | 7551 | | | 16.12.00 | " | " | |
| ROW 11 er Irob. | 7876 | | | -. -.04 | " | " | |
| ROW 12 Margit | 13076 | | | 13. 3.23 | " | " | |
| ROW 13 Enrika | 7025 | | | 6.12.13 | " | " | |
| ROW 14 Marge | 7559 | | | 18. 9.11 | " | " | |

| | | Belsen | Women<br>Nominal Roll Of Hungarian Nationals | Date<br>May, 3rd 1945. | |
|---|---|---|---|---|---|
| | Index | Family Name | Christian Name | | Profession |
| B 00093650 | | | | | |
| | 51 | ~~Mendelowier~~ Meister | Helen | | Household |
| | 52 | ~~Meister~~ | Ilona | | " |
| | 53 | Meister | Theri | | " |
| | 54 | Rosenberg | Gisela | | " |
| | 55 | Rothschild | Vera | | Pupil |
| | 56 | Wieder | Iboya | | " |
| | 57 | Breisack | Irene | | Dressmaker |
| | 58 | Kalmar | Flora | | Hairdresser |
| | 59 | Kal Mar | Ilona | | Pupil |
| | | | Anna | | Clerk |

| METADATA | TECHNICAL AUDIT QUERY | ◀ 1/13683 ▶ |

EXTRACTED DATA (4) ⌃

TEXT ABOVE
WOMEN
NOMINAL ROLL OF HUNGARIAN NATIONALS
BELSEN 2 DATE
MAY, 3RD 1945.

TEXT BELOW
RECKED FUND

PAGE NUMBER

✎ TABLE (26)

|   | INDEX | LAST NAME | FIRST NAME | PROFESSION |
|---|---|---|---|---|
| 1 | B 00093650 | MENDELOVICZ | HELEN | HOUSEHOLD |
| 2 | 51 | MEISTER | ILONA | |
| 3 | 52 | MEISTER | THERI | |
| 4 | 53 | MEISTER | GISELA | |
| 5 | 54 | ROSENBERG | VERA | PUPIL |
| 6 | 55 | ROTHSCHILA | IBOYA | |
| 7 | 56 | WIEDER | IRENE | DRESSMAKER |
| 8 | 57 | BREISACK | FLORA | HAIRDRESSER |
| 9 | 58 | KALMAR | ILONA | PUPIL |
| 10 | 59 | KAL MAR | ANNA | CLERK |

[ ? ] [ EXPORT ] [ SUBMIT ] [ SAVE ] [ CANCEL ]

FIG. 8B

LIST AND TABULAR DATA EXTRACTION SYSTEM AND METHOD

PRIORITY CLAIM

This application claims the benefit of priority under 35 U.S.C. § 119 to European patent application number 22305866.0, filed on Jun. 14, 2022.

TECHNICAL FIELD

The present disclosure generally relates to the recognition, classification, and extraction of data. More specifically, the present disclosure relates to a system and method for the intelligent extraction and analysis of list-based and tabular data from a heterogenous set of documents.

BACKGROUND

Many industries are required to create and/or maintain records for purposes of compliance and customer service. These records typically incorporate tabular or list-based presentations to organize their data. Tabular presentations offer a systematic yet highly logical way to represent data. As data storage increases at unprecedented rates, the automatic extraction of data for future use has remained a challenge. As the volume of data increases, so does the complexity of the tables, leading to errors in the compilation of data. Although optical character recognition (OCR) technology has been used to handle address tabular data extraction, the approach is generally unsuccessful as OCR alone is unable to reliably identify tables in a document, recognize the type of table (such as comparison reports or presentation reports), and frequently fails to handle the variety of structural layouts and visual relationships that are used in tabular presentations. Conventional processing techniques for extracting information from tables typically fail to accurately identify columns when the table is in a skewed orientation (e.g., as a result of document scanning errors) and/or can generate multiple cell recognition errors. For example, conventional processing techniques have trouble determining when two close together columns are distinct columns or when two widely spaced words within a column truly belong in a single column together.

There is a need in the art for a system and method that addresses the shortcomings discussed above.

SUMMARY

Systems with large quantities of data may suffer from inaccurate data classification, inefficient storage, unorganized record keeping, and other related problems. These and other deficiencies in data archival systems result in errors and inaccuracies in data organization. As large quantities of electronic data accumulate, it may become increasingly difficult to meaningfully identify and classify the electronic data in a reasonable amount of time. Thus, present approaches to electronic data storage and organization suffer from a variety of drawbacks, limitations, and disadvantages. There is a need for inventive systems, methods, components, and apparatuses described herein.

The proposed systems solve the problems that have made extraction of data from list-based documents by enabling improved table/list detection using list recognition, table segmentation, table localization based on row classification, and header inference based on column classification. List recognition enables documents containing lists/tables to be separated from those without lists and tables. This is especially important for document organization or clustering. One example where this has been applied is in museum archiving where documents may not be categorically organized by document type. In addition, the system offers highly accurate table segmentation, where columns are differentiated based on the signal analysis of column-wise mean pixel values, and rows are differentiated based on the textboxes from OCR results. The proposed solutions do not require any table border in the image. In some cases, the columns can be further merged based on the semantic analysis. Furthermore, table localization based on the row classification allows for more precise localization of the table, and removal of extraneous information from the top or the bottom of the document by incorporation of a line classification algorithm, whose output is used to determine whether a specific line is part of the table. Additionally, when headers are present, the system can identify them and use the header information to tag the table columns. However, when headers are not present, they can be inferred based on the column's classification using header ontology, for example by using a Conditional Random Fields (CRF) model. The assigned header can also be checked against the larger context of adjacent columns to ensure the selected header name is appropriate for the table as a whole.

In one aspect, the disclosure provides a method of tabular or list-based data extraction from document images. A first step of the method includes receiving, at a server and from a first data source, a first document including a first page, and a second step of performing a column-wise pixel analysis of the first page, thereby determining that the first page includes a first table. The method also includes a third step of performing column segmentation based on signal analysis of column-wise mean pixel values of the first page, thereby identifying a set of columns, and a fourth step of performing row segmentation using optical character recognition (OCR)-generated bounding boxes, thereby identifying a set of rows. A fifth step includes selecting which rows of the set of rows belong to the first table using a first Conditional Random Fields (CRF) model, thereby localizing the first table on the first page. In addition, a sixth step includes selecting, for each column in the set of columns, a header name from a pre-defined set of header names, the selection being based on a classification performed by a second CRF model that evaluates at least the entire contents of that column. Furthermore, the method includes a seventh step of mapping each item of data extracted from a cell in the first table to a field using semantic data understanding and an eighth step of generating a first digital table representing data extracted from the first table for presentation in a user interface.

In another aspect, the disclosure provides a system for tabular or list-based data extraction from document images. The system includes a processor and machine-readable media including instructions which, when executed by the processor, cause the processor to receive, at a server and from a first data source, a first document including a first page, and to perform a column-wise pixel analysis of the first page, thereby determining that the first page includes a first table. The instructions further cause the processor to perform column segmentation based on signal analysis of column-wise mean pixel values of the first page, thereby identifying a set of columns, and to perform row segmentation using optical character recognition (OCR)-generated bounding boxes, thereby identifying a set of rows. In addition, the instructions cause the processor to select which rows of the set of rows belong to the first table using a first Conditional Random Fields (CRF) model, thereby localizing the first table on the first page, and to select, for each column in the set of columns, a header name from a pre-defined set of header names, the selection being based on a classification performed by a second CRF model that evaluates at least the entire contents of that column. Finally, the instructions cause the processor to map each item of data extracted from a cell in the first table to a field using semantic data understanding, and to generate a first digital table representing data extracted from the first table for presentation in a user interface.

In another aspect, the disclosure provides a system that includes one or more computers and one or more storage devices storing instructions that are operable, when executed by the one or more computers, to cause the one or more computers to receive, at a server and from a first data source, a first document including a first page, and to perform a column-wise pixel analysis of the first page, thereby determining that the first page includes a first table. The instructions further cause the processor to perform column segmentation based on signal analysis of column-wise mean pixel values of the first page, thereby identifying a set of columns, and to perform row segmentation using optical character recognition (OCR)-generated bounding boxes, thereby identifying a set of rows. In addition, the instructions cause the processor to select which rows of the set of rows belong to the first table using a first Conditional Random Fields (CRF) model, thereby localizing the first table on the first page, and to select, for each column in the set of columns, a header name from a pre-defined set of header names, the selection being based on a classification performed by a second CRF model that evaluates at least the entire contents of that column. Finally, the instructions cause the processor to map each item of data extracted from a cell in the first table to a field using semantic data understanding, and to generate a first digital table representing data extracted from the first table for presentation in a user interface.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIGS. 4A-4C depict a sequence in which a skew of a document image is detected and corrected, according to an embodiment;

FIG. 7 is a schematic illustration depicting various stages of tabular data processing and extraction, according to an embodiment;

FIGS. 8A and 8B depict a user interface for viewing and interacting with the extracted data for a document image, according to an embodiment;

DESCRIPTION OF EMBODIMENTS

Figure 1:
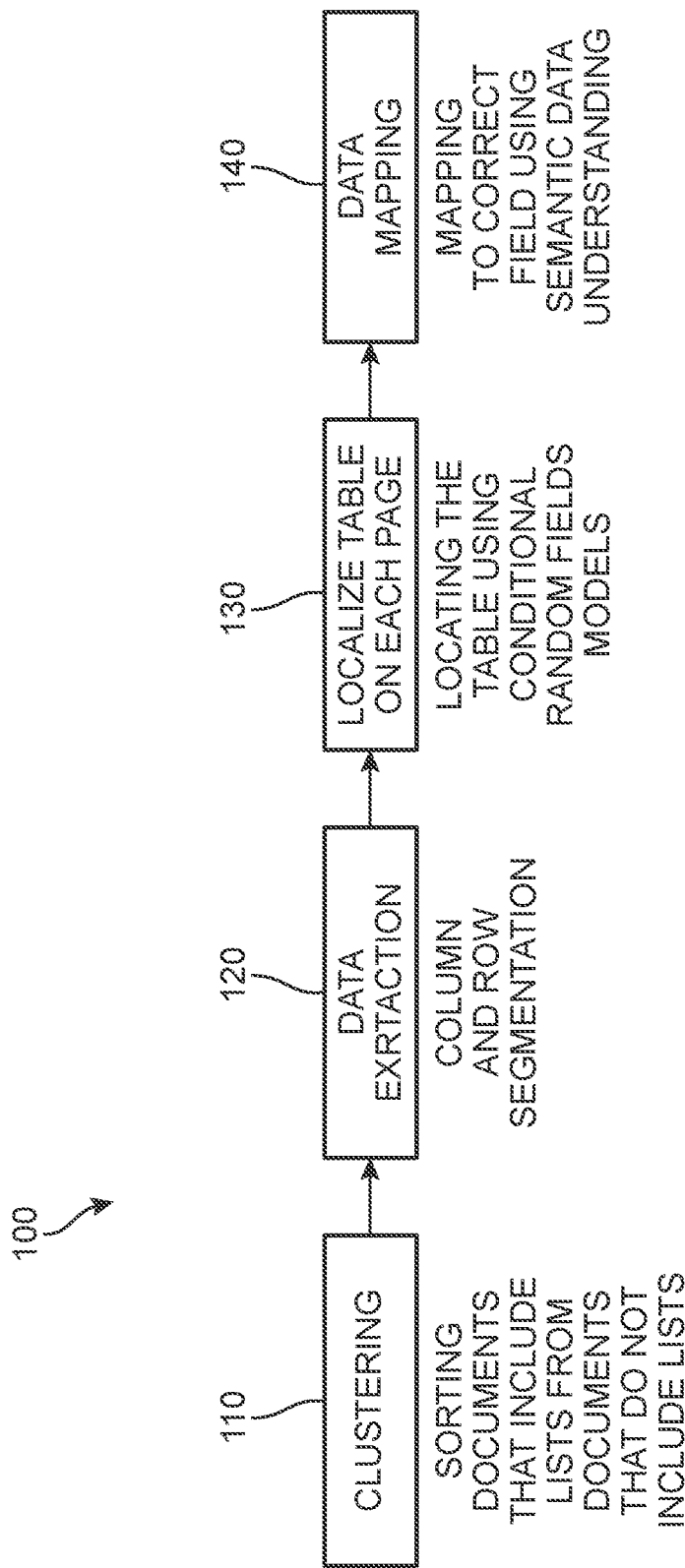
FIG. 1 is a schematic high-level flow diagram of an embodiment of a process of tabular data extraction.

The following embodiments describe systems and methods for intelligent extraction of list-based and tabular data. The proposed systems and methods apply machine learning techniques to intelligently recognize, classify, and extract lists and tables from scanned documents. For example, in some embodiments, the information may be lists from historical archives. In one specific example, the lists can include prisoner lists identifying prisoners of war. Given the wide swath of data that may be mistaken for having tabular content—such as ID cards, financial records, or administrative documents—the proposed table detection system can first determine if a table is present in a document, localize the table, and then perform a highly accurate extraction of the information included in the table. In different embodiments, the extraction techniques employ computer vision and Conditional Random Fields (CRF) models, which have been shown to require less training data and a shorter time to deploy compared to deep learning models. In one example, the embodiments can be used to recognize a table-format list even when there is no border present, using signal analysis on the pixel values. In some embodiments, the system is also configured to provide a semantic understanding of the table format using classification models, such that non-table portions may be excluded, and an appropriate header can be assigned to each of the columns.

For purposes of this application, a "header" refers to the label, category, class, or name that is assigned to or used to represent the contents of a single column. Thus, a table with five columns will also have five headers, one header for each column. The header succinctly describes the type of data/content that is to be entered in the cells below. Similarly, a row header is usually to the left of the first column, and helps to identify the content being represented by each of the rows that follow below. Thus, it should be understood that the term "header" in this application is used for table/list columns and table/list rows, and is not being used to refer to a page or document header, which is typically text that is separated from the body text and appears at the top of a page. This text will instead be referred to as a "running head" to differentiate it from the usage of header for the columns and rows.

In different embodiments, the proposed techniques offer an end-to-end solution toward the organization of a set of documents based on similar characteristics. In particular, documents processed by the disclosed extraction system may be generated by photography or scanning of physical documents. The disclosed information extraction systems and methods are highly customizable for implementation across multiple industries and regions. In other words, although the examples described herein are directed toward improvements in extraction of tabular data in documents stored in historical archives, it may be appreciated that the proposed techniques may be readily utilized outside of these purposes. For example, the proposed systems may be implemented by insurance companies, auditors, accounting firms, financial institutions, research facilities that generate large amounts of data, warehouse managers, or more broadly by any entity that rely on tables for data storage. Additionally, the disclosed system and methods can extract data with improved accuracy compared with conventional methods, allowing for the organizing and classifying of heterogeneous set of documents into either (a) documents containing lists/tables or (b) documents without lists and tables, localization of tables amidst header and footer information, the extraction of information without clearly defined tables and boundaries, and the correct mapping of information to defined fields based on semantic data understanding, even if their location within a document is inconsistent and varied, and not located directly adjacent to the data header.

Furthermore, the proposed embodiments offer advantages over conventional techniques, which cannot reliably process skewed images (leading to misaligned rows), fail to correctly segment columns that are positioned close to one another, have failed to extract rows, do not generate appropriate header information, and frequently miss cells of information. In addition, such techniques rely on large sets of training data. In order to address these types of shortcomings, the proposed system pre-processes the images and uses several approaches together to determine columns, without relying on deep learning models.

As a general matter, the proposed systems can be implemented as part of a larger machine learning (ML) text analysis system configured to serve as a natural language processing (NLP) tool specially geared for document processing, process automation, and knowledge base creation. The ML text analysis system can identify relationships within unstructured documents and index these relationships in searchable databases, as well as detect patterns from document corpuses.

For purposes of context, the ML text analysis system can be understood to comprise several modules, including a(n) (a) text automation module for text classification, information extractions, connectors; (b) document reader module for scanned image classification, template documents, OCR, and targeted OCR; (c) a text data discovery module for similarity, patterns, clustering, topic discovery and modeling, visualization; (d) a monitoring module for monitoring, configuration, maintenance, retraining, notifications; and (e) escalation portal module for escalation, document and extracted data visualization, resumed execution. In this larger context, the proposed embodiments may be incorporated as part of the document reader module, which typically (1) receives an inputted image, performs image preprocessing and manipulation techniques to clean the image for better results, (2) performs segmentation of the image, in particular to the section of the image where a specific type of information is located, or to the whole image, (3) extracts information such as text from the section of the image selected during segmentation by using machine learning models, (4) postprocesses the extracted information to structure the data to the desired format, and (5) generates the structured output. Thus, in some embodiments, the proposed extraction techniques and systems can be understood to operate as part of a larger text analysis paradigm.

Referring to FIG. 1, for purposes of introduction, an example of an extraction flow 100 is depicted. The extraction flow 100 includes a first stage 110 in which a given document can be classified based on whether the document content includes a table or list. In the example of prisoner lists, this would involve separating prisoner lists from non-lists, because the historical archives store a trove of documents that have not yet been organized. It can be appreciated that the design and format of these lists can vary widely in structure. The proposed systems can determine whether the document includes a list or table by clustering. More specifically, in some embodiments, column-wise pixel signal analysis is employed to determine with confidence whether a document includes a list or table, regardless of their structural variations. In one example, the document is initially preprocessed using deep learning binarization techniques.

In a second step 120, data extraction using column and row segmentation can be performed of start and endpoint of the table. The data from the image is extracted, even where there are no boundaries for the tables or lists ("boundaryless"). In one embodiment, column segmentation is performed based on signal analysis on column wise mean pixel values, line detection based on Computer Vision (CV) techniques, and clustering models. Furthermore, row segmentation is performed using OCR bounding boxes. As a general matter, OCR can be performed via an OCR engine, such as Tesseract 4.0, or other OCR services available.

In a third step 130, the lists or tables can be localized on the images. It can be appreciated that in many cases, there may be extraneous information on a document that is not part of the table/list. Thus, table or list can be located using Conditional Random Fields (CRFs) models to classify if a row belongs to the table or not. Columns are further merged or split based on semantic understanding of the columns and the content in each column. Semantic data understanding in a CRF is leveraged to determine the header of the table, even if there originally was not a header present. In other words, even if the original image had no header for a particular column, the proposed embodiments can select a title based on the contents in the given column. This step can also be particularly important in cases where there is a long running header and/or footer on a document. Thus, based on the localization, the columns can be re-segmented to correctly encapsulate or represent the information in the image, even in cases where the image may have been distorted.

Finally, in a fourth step 140, data is mapped to the correct corresponding field utilizing semantic data understanding. This is done even in the absence of headers identifying the information. Semantic data understanding can also be used to train the machine learning models to recognize certain types of information (e.g., is a number a date or prisoner number, is a column referring to occupation or birthplace, etc.). Using this understanding, data in the document can be mapped back to a specific format. The output can be mapped to a user interface (see FIGS. 8A and 8B) or electronic table such as an Excel® or other spreadsheet.

Figure 2:
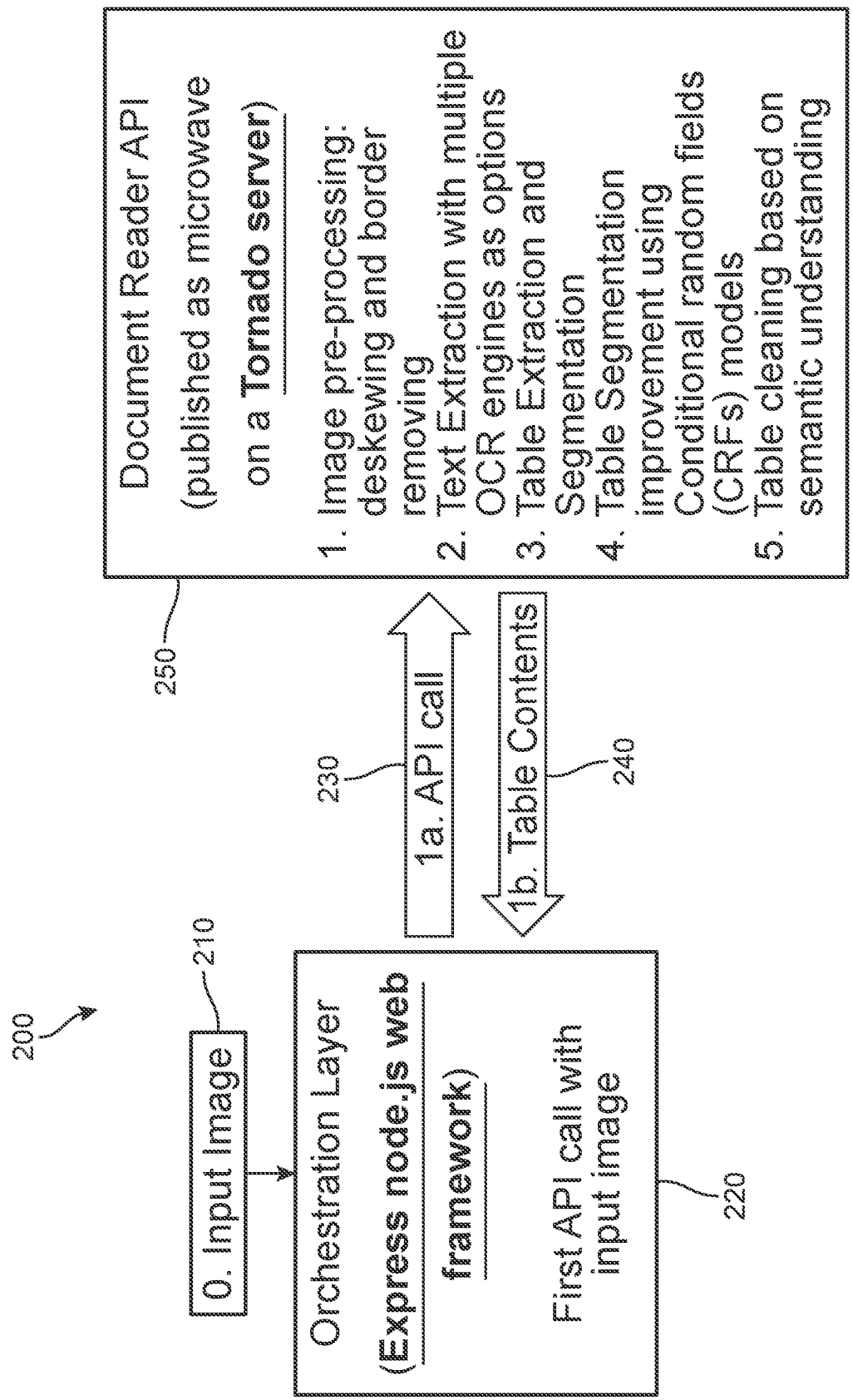
FIG. 2 is a schematic system diagram of some components for a document processing environment, according to an embodiment.

FIG. 2 illustrates a schematic diagram of an embodiment of a document reader and data extraction system ("system") 200. In different embodiments, some or all components of the proposed system can be hosted on a remote server and/or other SaaS (Software as a Service) applications. For example, one or more resources of the system may be run on one or more servers. Each server may be a single computer, the partial computing resources of a single computer, a plurality of computers communicating with one another, or a network of remote servers (e.g., cloud). The one or more servers can house local databases and/or communicate with one or more external databases.

As a general matter, in different embodiments, the key components of the system 200 can be incorporated in an Application Programming Interface (API) service, which can be called by an orchestration layer 220 during deployment. In FIG. 2, an input image 210 is received by the orchestration layer 220 (e.g., the machine learning text analysis system described above). In one example, the orchestration layer 220 is implemented as an express node.js web framework. The orchestration layer 220 can send an API call 230 to document reader API 250. In one example, the document reader API 250 is published as a microserver, such as (but not limited to) on a Tornado™ server. The document reader API 250 can perform a sequence of steps to extract table context 240, including image-preprocessing, text extraction, table extraction and segmentation and improvement, and table cleaning. These steps will be described in greater detail below.

As noted earlier, document classification can employ binarization techniques. Document image binarization is often performed in the preprocessing stage of different document image processing related applications such as optical character recognition (OCR) and document image retrieval. Binarization converts color or gray-level images into binary images. For example, binarization can be used to convert a gray-scale document image into a binary document image and accordingly facilitates the ensuing tasks such as document skew estimation and document layout analysis. The technique can initially involve a grayscale conversion of the image. The intensity value for each pixel is a single value for a gray-level image. In another example, binarization methods extract statistical values based on the spatial distributions of gray level values in the image.

Figure 3:
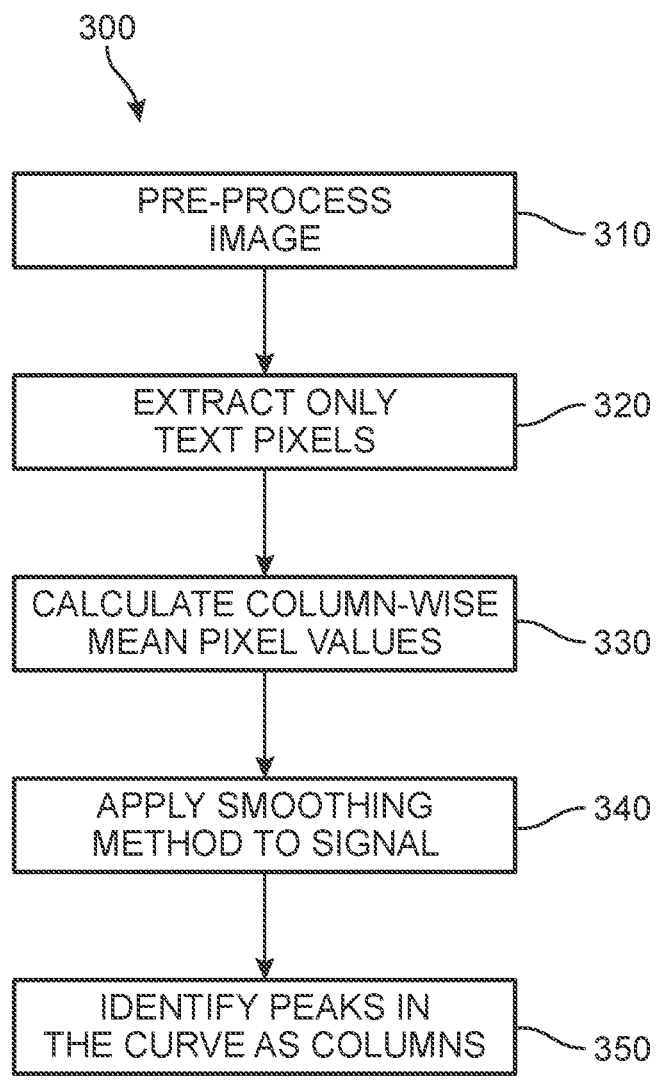
FIG. 3 is a schematic flow diagram of an embodiment of a process for column segmentation using binarization techniques.

Referring now to FIG. 3, a binarization process 300 for detecting table or list columns in an image is presented. In a first step 310, the image is pre-processed to isolate and extract the text-based pixels in a second step 320. In a third step 330, column-wise mean pixel values are calculated following a column-wise pixel scan. For purposes of this application, column-wise mean pixels values refer to an average of pixel intensity for pixels in one 'line' extending down in the same direction as a column; in other words, an average of pixel intensity for each vertical strip (from top of page to bottom of page, or from top of table to bottom of table) of pixels. Thus, for a gray image, a column-wise scanning from left to right may be employed in some embodiments. Starting from the upper left position, the scanning is going downwards until it reaches a point which is also an edge point or the end of the boundary if there is no edge. The scanning is repeated starting from the lower left position going upwards. In some embodiments, for each pixel column, the lowest and highest positive pixels are selected as the envelope of the signal. The signal's coordinates are then computed as the mean of the upper and lower envelopes.

In a fourth step 340, a smoothing method is applied to the values to smooth the curves in the signal, such as a minmax-concave total variation denoising technique, or other variational denoising methods such as total variation regularization, non-local regularization, sparse representation, low-rank minimization, or Convolutional Neural Network-based (or CNN-based) denoising methods and spatial domain filtering. Finally, in a fifth step 350, peaks are detected in the outputted curve and used to identify the number and location of columns in the image.

Additional details regarding these processes are now presented in FIGS. 3A-3C and FIG. 4. In an optional stage, the pre-processing can include techniques to determine whether the table or list is skewed, which can interfere with the accurate identification of each column. In FIG. 3A, an example of a document image 400 that was received at a first skew angle 412 (measured against the horizontal axis) is shown. The higher the value of the column-wise mean pixel value (y-axis), the greater white (less pixel text) can be understood as present in that line (higher pixel intensity), while a higher proportion of text would be registered as a lower pixel intensity. Thus, for a paragraph or block of text (no table), the signal will be very noisy, while a table of data would be associated with a signal that is far more structured, comprising with a pattern of high-lows.

Conventional processing techniques typically fail to accurately identify columns when the table is in a skewed orientation (e.g., as a result of document scanning errors) and/or can generate multiple cell recognition errors. In this case, the first signal 410 is substantially noisy throughout, with a high degree of level of variance (first variance level), corresponding to the near-continuous presence of text pixels as the image is analyzed in vertical strips, from top to bottom (i.e., what should be in an up-to-down direction extending from a first row in a first column to the last row in the same column, etc.). Thus, it can be appreciated that where a table or list has been rotated (skewed) or is otherwise insufficiently aligned with the horizontal/vertical axes, the signal will be more consistently noisy across, while a relatively 'straight' (substantially aligned with the horizontal and vertical axis) table or list will have regions of empty space between the pixel-filled regions serving to separate or make distinct each column from its neighbor.

In different embodiments, in order to begin the deskewing process, a binarization algorithm can be applied to the document image to generate a bicolored (black and white) image. In one example, the black parts (in this case, all of the text that is present in the image) will be highlighted once the image has been binarized. This binarized image is then used to produce a signal. In different embodiments, the binarized image can be rotated over a set of angles (e.g., rotation between "−X" and "+X" degrees where X is at most 90 degrees). The image where the signal has the highest variance will be the "deskewed image" that will be used by the system during data extraction and segmentation. Simply for purposes of clarity, in an example deskewing scenario, the system can select a set of angles that fall between a first angle and a second angle, such as a range of angles between −30 and +30 degrees. The selected set is equally distributed over the range. For purposes of this example, the system can select 61 angles, such as angles −30, −29, −28, −27, . . . , −1, 0, 1, . . . , 27, 28, 29, 30. In some embodiments, the system can then rotate the binarized image by these angles, and for each different orientation, generate and produce a signal. For each of these 61 signals, the system will calculate its variance, and then select the image at the orientation where the corresponding signal has the highest variance as its designated 'deskewed' image.

In some embodiments, the system is configured to execute a second round after the first round to further fine-tune the orientation. As a non-limiting example, if during the first iteration the image with the highest variance was oriented at an angle of −15 degrees. During a second iteration, the system can assess smaller increments of rotation. For example, the system may test the image at increments spaced apart by a tenth of a degree, such as orientations ranging from −15.9 to −14.1. In this case, the system can then scan the range −15.9, −15.8, . . . , −15, −14.9, −14.8, . . . , −14.1 and determine which orientation is associated with the highest variance (e.g., if the signal generated for the image when it was rotated by −14.4 had the highest variance, then −14.4 would be identified as the final deskewing angle). Other smaller fractions of a degree, such as 0.05, 0.01, etc. can also be selected depending on the precision with which the variance is to be calculated and assigned for each orientation.

Figure 4A:
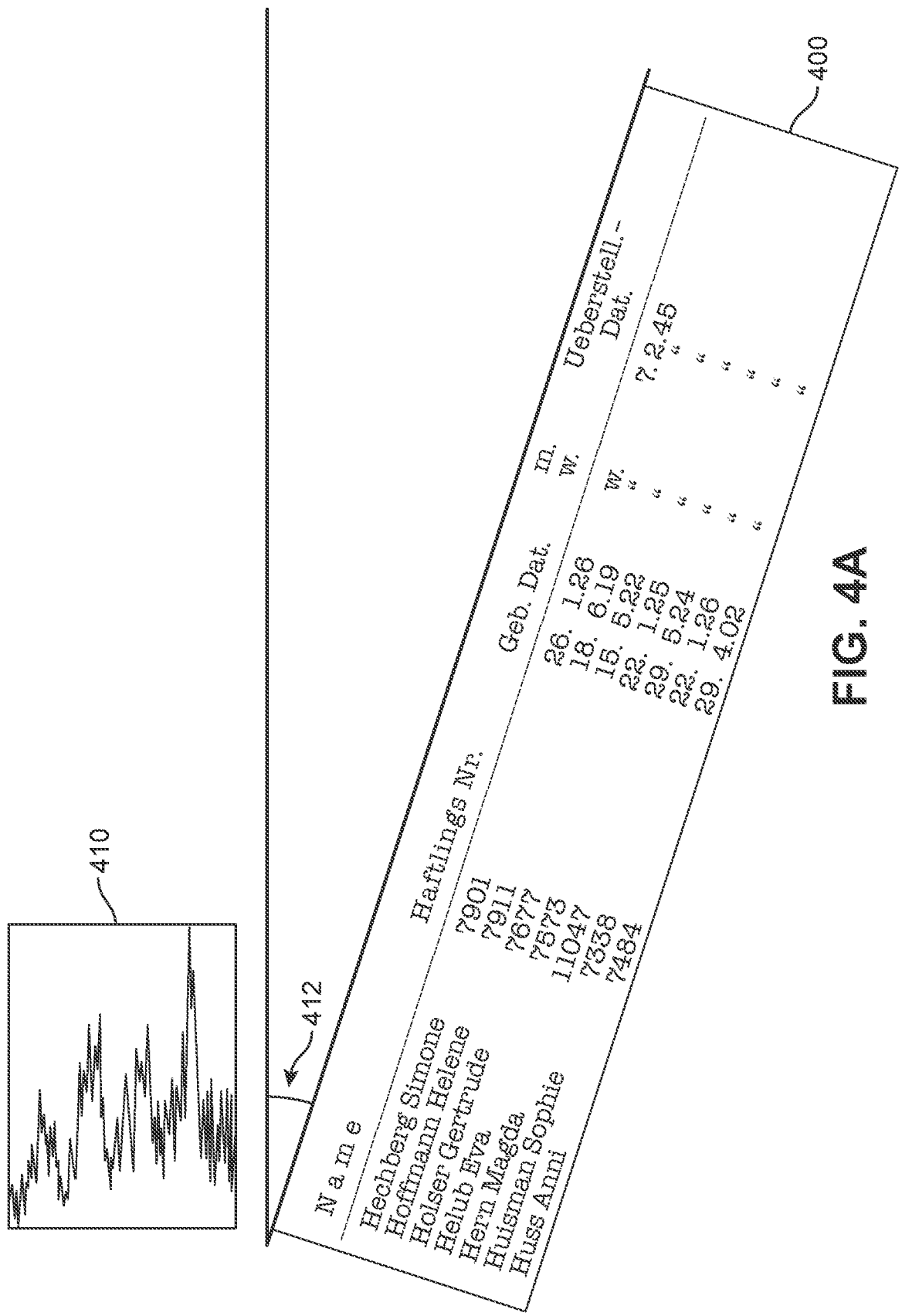
Figure 4B:
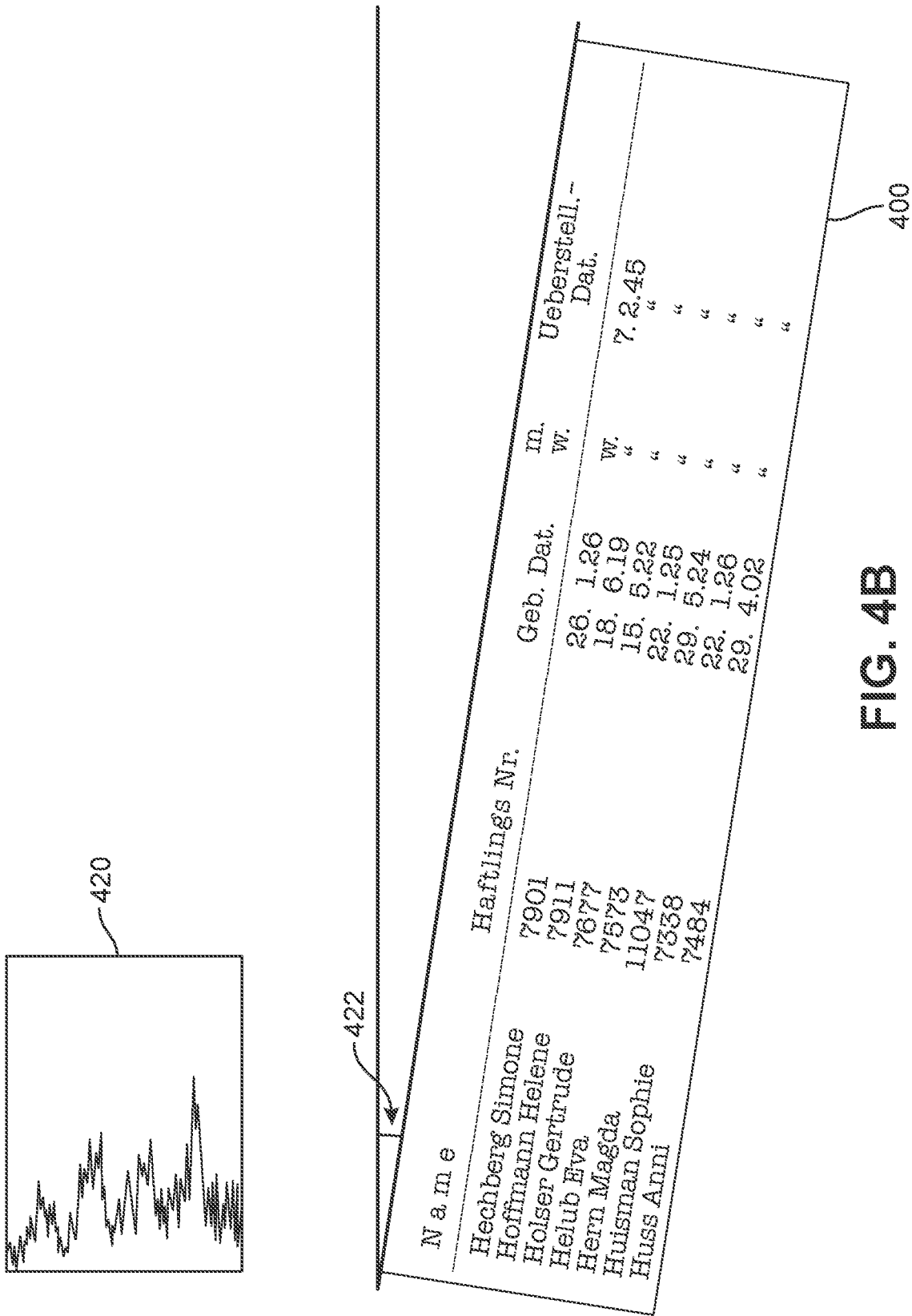

For purposes of illustration, FIG. 4A shows an example where the binarization technique has been employed to produce a first signal 410 that represents the document image 400 in its skewed orientation (at a first skew angle 412). In some embodiments, the signal is produced by performing an evaluation of the rows of the binarized image individually, and furthermore, for every row, counting the number of white pixels in that row. As another example, simply for purposes of comparison, FIG. 4B presents the same document image 400 at a second skew angle 422 with a corresponding second signal 420. It can be appreciated that the two signals differ, and both indicate some degree of unacceptable skewing.

In different embodiments, the binarized image will be automatically rotated in order to produce a first signal, a second signal, a third signal, etc., and for each signal "S", the variance is calculated. In one embodiment, the variance of each signal S can be calculated using Equation (1) below:

$$\text{Var}(S) = \frac{1}{N}\sum_{i=1}^{N}(x_i - \mu)^2.$$

Where N is the total number of rows, $x_i$ is the number of white pixels in row i and $\mu$ is the mean value of the signal.

The signal with the largest variance will thus be the one where the signal ($x_i$) differs most often and greatly from the mean ($\mu$). This is illustrated in FIG. 4C, which in this case the system determines is the correctly aligned image. A third skew angle 432 (measured against the horizontal axis) is now essentially zero, and the variance in the signal, when compared to the signals for the other skew angles, is at its highest. It can be observed that the third signal 430 is relatively clean, with spacing between recurring peaks. Based on this analysis, the system can determine that the alignment of document image 400 has been corrected to the extent that the skew has been effectively removed and column detection can now be performed with greater precision. Thus, the binarized image that produced the signal with the largest variance can be selected before the next step is performed.

Figure 5:
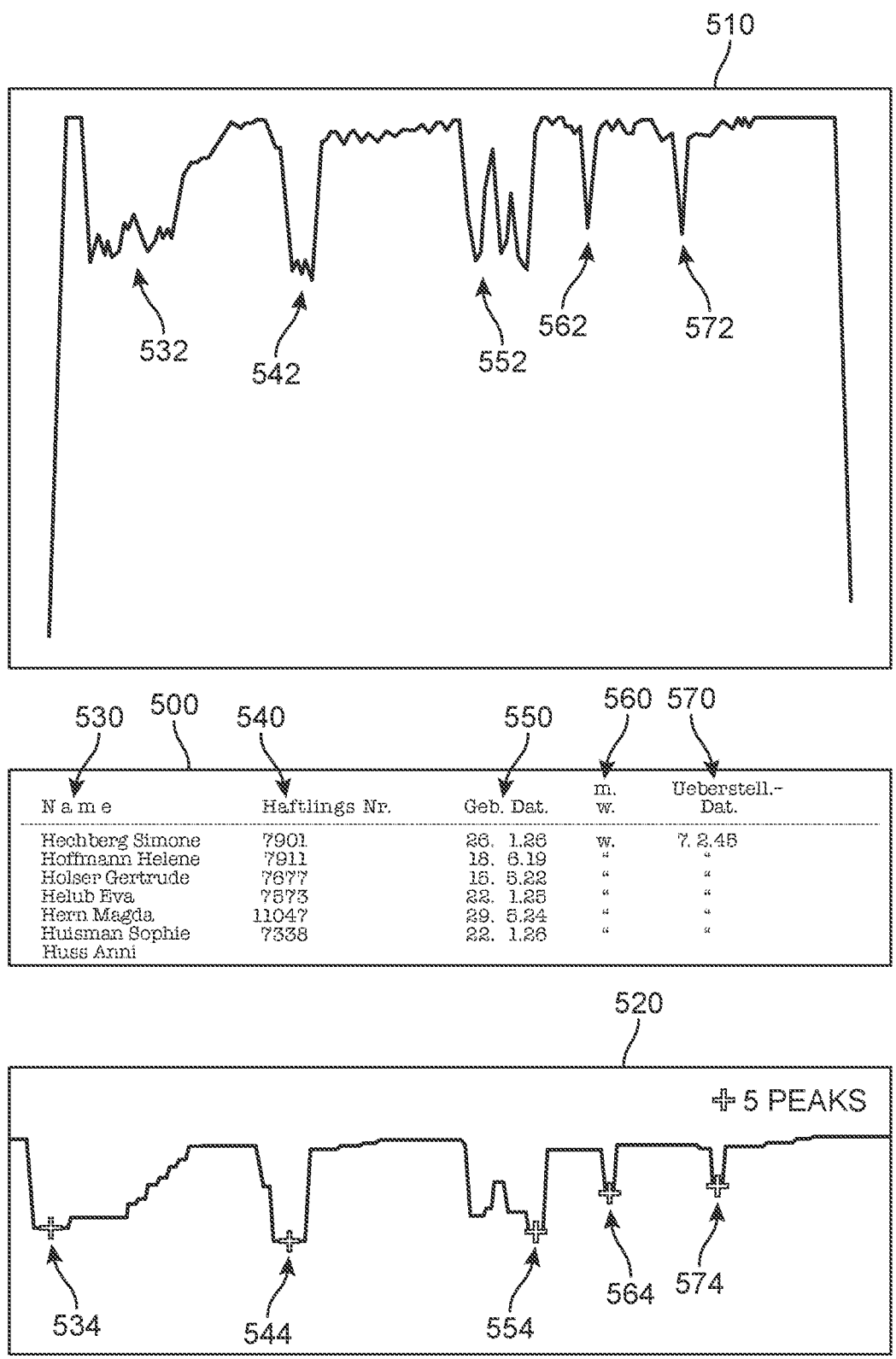
FIG. 5 illustrates an example of column segmentation based on signal analysis, according to an embodiment.

In some embodiments, in order to improve the accuracy of and verify the column identification, additional denoising can be performed. An example of this operation is presented in FIG. 5, where the moving average of the column-wise mean pixel values (y-axis) for the third (raw) signal 430 has been calculated and used to generate a less noisy fourth signal 510. The moving average filter replaces each pixel with the average pixel value of it and a neighborhood window of adjacent pixels. The effect is a smoother image with sharp features removed. This fourth signal 510 can be seen to include a sequence of reverse-peaks (valleys), including a first peak 532 corresponding to a first column 530 (shown in the document image 400 below), a second peak 542 corresponding to a second column 540, a third peak 552 corresponding to a third column 550, a fourth peak 562 corresponding to a fourth column 560, and a fifth peak 572 corresponding to a fifth column 570. An example of the output following minmax-concave total variation denoising of the fourth signal 510 is shown as a fifth signal 520 presented below the document image 400 in FIG. 5. Fifth signal 520 more clearly reveals the contrast between the regions of 'white' (no text-pixels) as space between columns, and the regions of text-filled pixels that correspond to each column. More specifically, a first dip 534 corresponding to the first column 530 (shown in the document image 400 above), a second dip 544 corresponding to the second column 540, a third dip 554 corresponding to the third column 550, a fourth dip 564 corresponding to the fourth column 560, and a fifth dip 574 corresponding to the fifth column 570. Furthermore, the fifth signal 520 more clearly and correctly delineates the width of each column (i.e., from left to right) by the extent to which the width of the dip extends each time. Each of these can be extracted to determine how many columns are present on the page. It should be appreciated that this process can be used without the removing any header(s) present on the page.

Figure 6:
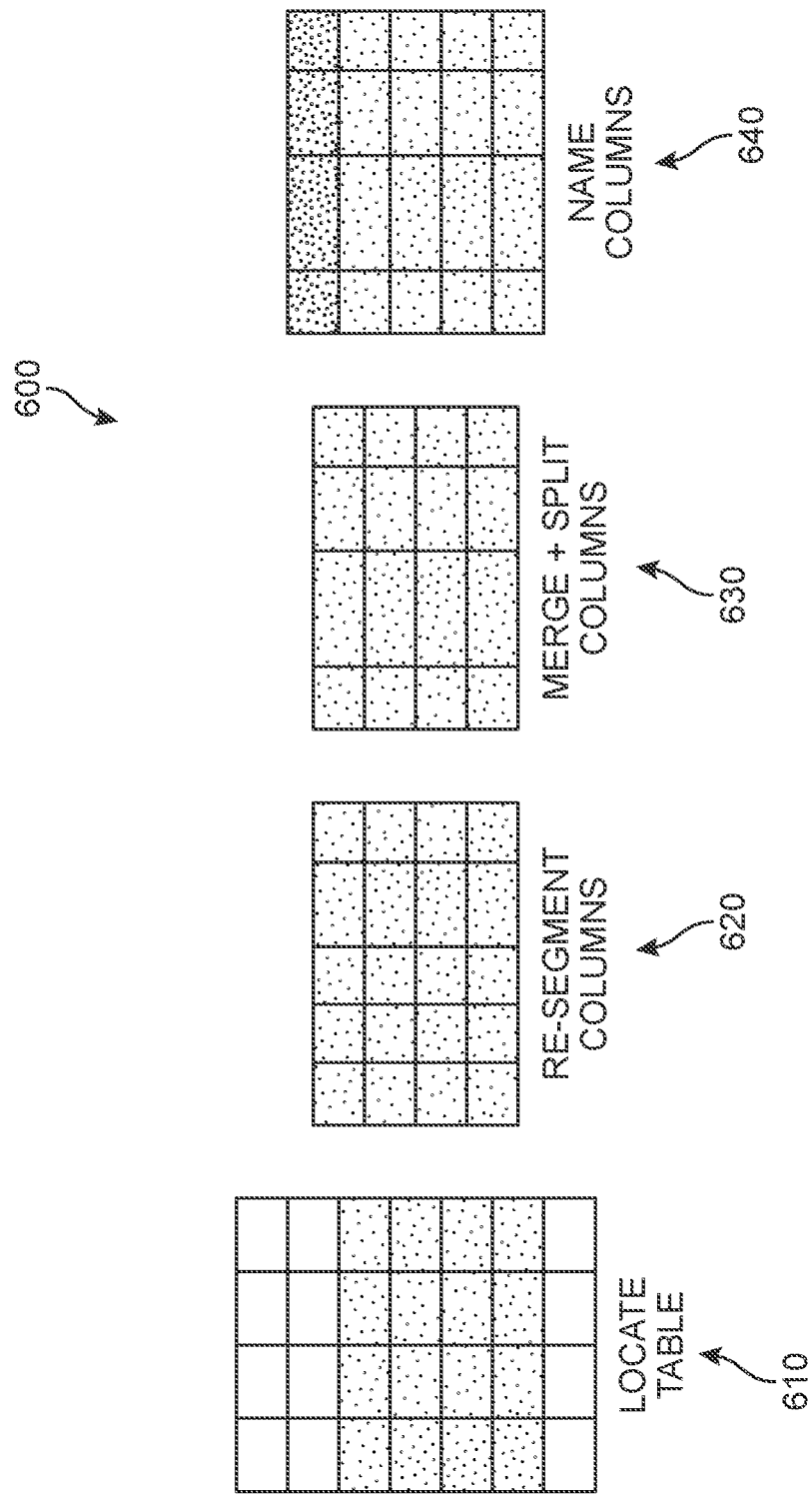
FIG. 6 is a schematic flow diagram of a localization process, according to an embodiment.

Moving now to FIG. 6, an overview of a localization process 600, according to an embodiment, is depicted. In a first stage 610, the table or list in the image will be detected (located). In different embodiments, for localization of the table, the predictions made by the CRFs model's row classification algorithm are leveraged. As noted earlier, CRFs refer to a discriminative undirected probabilistic graphical model. The most common usage for text analysis is the selection of a region of neighboring words. However, with respect to the proposed systems, CRF models are used to perform row/column classification (rather than word classification). For rows the task is to cluster into three classes: "header row", "table row", and an "other row". Based on this, the position of the actual table on the page can be determined accurately. The CRF model was selected as it considers the context of information, rather than just a single aspect of data at a time. In other words, the model will attempt to predict a certain goal based not only on the individual row content being focused on, but also on the previous (above) and next (below) row. This larger view allows for improved labeling of each row. In addition, the CRF model is better equipped to predict whether a line is a header or is actually inside of the table, or if it is another row of data, or outside of the table. This process enables table localization with a high degree of precision. A set of training data was generated to train the CRF model to classify the rows and columns with such precision before model deployment.

The columns are also classified using a similar approach, where each column is assessed in the context of the previous column and the next column to determine to which class the column belongs. For columns, the task is to predict what the column "name" should be (i.e., the header of the table). For this task, a plurality of specific classes for different column names were designated. Simply for purposes of clarity, some examples can include: "first name", "last name", "date of birth", "profession", "prisoner number", etc. It should be appreciated that during training of the ML (CRF) model, an important step required capturing the salient features of the input. These features must be selected carefully, as they are the basis by which the CRF models can classify the rows and columns. The trained CRF model can then evaluate an entire column's contents (not just one cell in the column), as well as columns adjacent to the selected column, in order to calculate a set of features (see some examples of features below). With the calculated features the trained model can then (based on these features) make a prediction. Thus, the CRF model does not simply use one column and then predict the class, but also takes the neighboring columns into account. This larger-scale assessment ensures that the column header prediction by the model is appropriate not just in the context of the selected column's contents, but in the surrounding context of its neighbor's contents, confirming the header makes sense within the bigger picture of the table itself.

One example of the localization process 600 is depicted with reference to a scanned document 702 in FIG. 7. In the first stage 610, signal analysis labeling is used to demarcate the scanned document 702 as shown, with a plurality of horizontal lines 780 and a plurality of vertical lines 770. The plurality of horizontal lines 780 are used to automatically identify each row (e.g., shown as "row 0", "row 1", "row 2" . . . "row 14") by the system. In addition, row classification is performed, labeling a first section 710 ("other"), a second section 720 ("header"), and a third section 730 ("table").

For purposes of this example, some CRF features selected for the row classifier included: (a) Date, (b) Empty fraction (fraction of empty cells in a row), (c) Average length (average length of cell content), (d) Position tag (position of row in the document), and (e) Keyword matches fraction (first concatenating all keyword lists described to one main list, whereby the feature can return the fraction of cells in the row/column where a match was found in the main list—this feature is very important for row classification, since the header row(s) can have many matches with those keywords).

Some CRF features selected for the column classifier included: (a) Date, (b) Empty fraction (fraction of empty cells in a column), (c) Average length (average length of cell content), (d) Position tag (position of column in the document), (e) Keyword matching (for every possible class there is a list of keywords, e.g. "city: [place of birth, birthplace, geburtsort, . . . ]" (the latter is German for birthplace); the feature will return, for every row/column, a set of classes for which a match is found in the list), (f) First name (a score in which cell content is matched to a large database of first names, where the more the number of matches, the higher the score), (g) Last name (a score in which cell content is matched to a large database of last names, where the more the number of matches, the higher the score), (h) City (a score in which cell content is matched to a large database of cities, where the more the number of matches, the higher the score), (i) Sort iterations (the number of iterations performed to sort the row/column (will be a low value if the sort is alphabetical), (j) Average (average value for numbers in row/column), (k) Standard deviation (standard deviation for numbers in row/column), (l) Capital fraction (fraction of capital letters in row/column), (m) Number fraction (fraction of numbers relative to letters in row/column, and (n) Header (if there is already a header found by the row classifier, the column classifier can verify).

In some embodiments, during localization of the table, the rows that are classified as "other" can be removed and the content can be stored to show later in other fields in the user interface. If a header is detected by the row classifier, this can be used as a temporary header—the column classification algorithm can later standardize the header to ensure only a specific set of column names is used. In general, row classification can also be based on the row's position in the document (a low row number is higher up in the document, a high row number is lower in the document). Furthermore, the average length of the values or tokens in each cell can be used to match the content to the system dictionary or translation engine. Thus, in different embodiments, each value can be matched to a pre-generated dictionary that can translate the word from one language (e.g., German or Polish) to another (e.g., English). It can be appreciated that such translation can be enabled not only from one language to another, but for abbreviations that may serve as headers in a table.

Returning to FIG. 6, in a second stage 620, column segmentation is performed. During this stage, the rows that are classified as "other" can influence the quality of the column segmentation and hence the table segmentation. Therefore, the columns are re-segmented based on only the information in the table, and the rows that are classified as "header" or "table". In some embodiments, the rows that were "other" are removed and signal analysis (binarization) again employed to more precisely determine the position of each column.

In a third stage 630, columns can be merged and split based on semantic data understanding. This stage provides improved column recognition. During the third stage 630, the system can select two adjacent columns and attempt to merge them. Subsequent semantic analysis can then be performed to determine whether the merged column is a more likely column candidate than the two separate columns. This process is repeated for each set of adjacent columns. A non-limiting example is shown in FIG. 7, which includes a first set 750 of two closely-positioned columns (a first column "Geb." and a second column "Dar."), in this case representing birth dates. In this case, if the two columns are merged, the system determines that the cell contents can look more like a date, with two dots and three numbers, a typical date format for the document type. The system can then automatically merge the two columns to produce a single birthdate column. In contrast, when a second set 760 of two adjacent columns (a first column "m./w." and a second column "Ueverstellungs Datum"), representing gender and date of recordation, are merged, the system determines the cell contents have no match to any reference value or token, and should be rejected. Thus, these two columns remain split as separate columns of data.

In other words, based on the outputted patterns, the system can decide to either merge or split the detected columns. For every set of two consecutive columns, the system can attempt to merge the content and see if the new column content reflects a more regular expression matching than before the merge, which would indicate a merge should occur. Furthermore, the column split can also be applied to each individual column, with the goal being to maintain the split of one column into two columns if the system determines there is a high likelihood that the column actually includes contain content for two columns. In this scenario, a first step includes checking the content in each column using regular expressions (regex). In other words, if the content in that column consists of regex patterns from two columns, the column is split into two columns. For example, if in a "NAME" column the system detects regex patterns of both column types 'ID' and 'NAME', there will be a determination that the column should be split.

In the next, second step, the system determines where to split the content. In one embodiment, the split is based on the regex pattern. In some embodiments, after determining the content of a column consists of regex patterns from two column types, and deciding that column then needs to be split into two columns, the text of each cell for that column is divided into two parts based on the regex matching. For example, in FIG. 7, a cell initially containing the content "w. 7.2.45" was split into "w." and "7.2.45", since they match the "GENDER" and "DATE" patterns, respectively. The following cells were also divided in the same way. As another example, the following column:

TABLE 1

| 1063 Barbara |
| 1004 Olga |
| 1969 Erna |
| WooTheresa |
| 1967 rora | would be automatically split into two columns by the system, as shown below:

TABLE 2

| 1063 | Barbara |
| 1004 | Olga |
| 1969 | Erna |
|  | WooTheresa |
| 1967 | rora | upon the system's determining the content matches the "ID" and "NAME" regex patterns, respectively.

In different embodiments, in order to ensure the split outputs columns with the correct (appropriate) content once the system determines a split should occur, the system is configured to divide the bounding box of the original column into two bounding boxes for the new columns in a third step. This division will affect the visualization of the table, or how the columns are located on the page. In some embodiments, the system applies an approximation technique to determine the left and right boundaries of the new columns. This approach evaluates the number of characters belonging to the two columns separately. The width of original bounding box is then divided based on the proportion of the number of characters in each column. For example, in the above table (see TABLE 2), the new left-handed column has on average 3.2 characters per cell and the right-handed column has 5.8 characters per cell. In response to this calculation, the system can assign the left-handed column a width of 3.2/9 of the original column (see TABLE 1) while the right-handed column will be assigned 5.8/9 the width of the original column.

Returning to FIG. 6, the localization process 600 also includes a fourth stage 640 in which each of the columns are assigned a name (header). This stage involves a determination of the column type which can be used to predict the header. If there is a header present in the document (as in FIG. 7), the system can enter the header as one of the features for a column classification CRF model by matching it with keywords. For example, class "birth date" has keywords ["date of birth", "born on", "age", geburtsdatum"] where the latter is German for birth date. If there is no header in the document, which is the case for the majority of such documents, the CRF model can still accurately predict the column type by using the other features described earlier. In other words, if a table does not include a header, the system can base the column name on the cell content, as obtained by the previous CRF models and the designated features. The system can take into account the full column, and calculate those features based on all the content in this column, before selecting or confirming a header.

For purposes of illustration, one non-limiting example of a user interface, shown as a first interface 800A in FIG. 8A and a second interface 800B in FIG. 8B, and referred to collectively as user interface 800, is now described. In FIG. 8A, the first interface 800A an image of a photographed document 830 is provided for reference by the user as they review the extracted data (see FIG. 8B). The photographed document 830 includes a plurality of columns 844 and headers 840. The first interface 800A further offers selectable options 860 for navigation and interaction with the image, as well as a menu 802 for handling the file and data.

In FIG. 8B, the second interface 800B presents an electronically organized and tabulated version of the same information shown in the image of FIG. 8A, using the systems and methods described herein. Near the top of the second interface 800B, a number 820 of extracted columns (4) is shown. Directly following is the "Other" information that contextualizes the table. In this case, text above 822 includes "Women/Nominal Roll of Hungarian Nations/Belsen 2 Date/May, 3 1945.", as also reflected in the image of FIG. 8A, and text below 824 "recked fund" and "page number" in FIG. 8B, which is not shown in FIG. 8A due to spacing constraints in the drawing. In some embodiments, translation is automatically performed. In this case, the headers 840 in FIG. 8A (e.g., "Regd.Id.", "Family Name", "Christian Name", and "Civilian Trade") are passed through the system, which replaces these headers with standard, common, or current header labels ("Index", "Last Name", "First Name", "Profession") for ease of understanding.

Furthermore, in some embodiments, interaction with one portion of the data in either interface can be automatically reflected in the other interface. For example, selection of a first cell 892 in the second interface 800B causes selection and highlighting of a corresponding second cell 842, allowing the user to readily match the extracted data with the original document. The reverse can also be provided, where selection of the second cell 842 causes a highlight of the first cell 892 to be presented.

Figure 9:
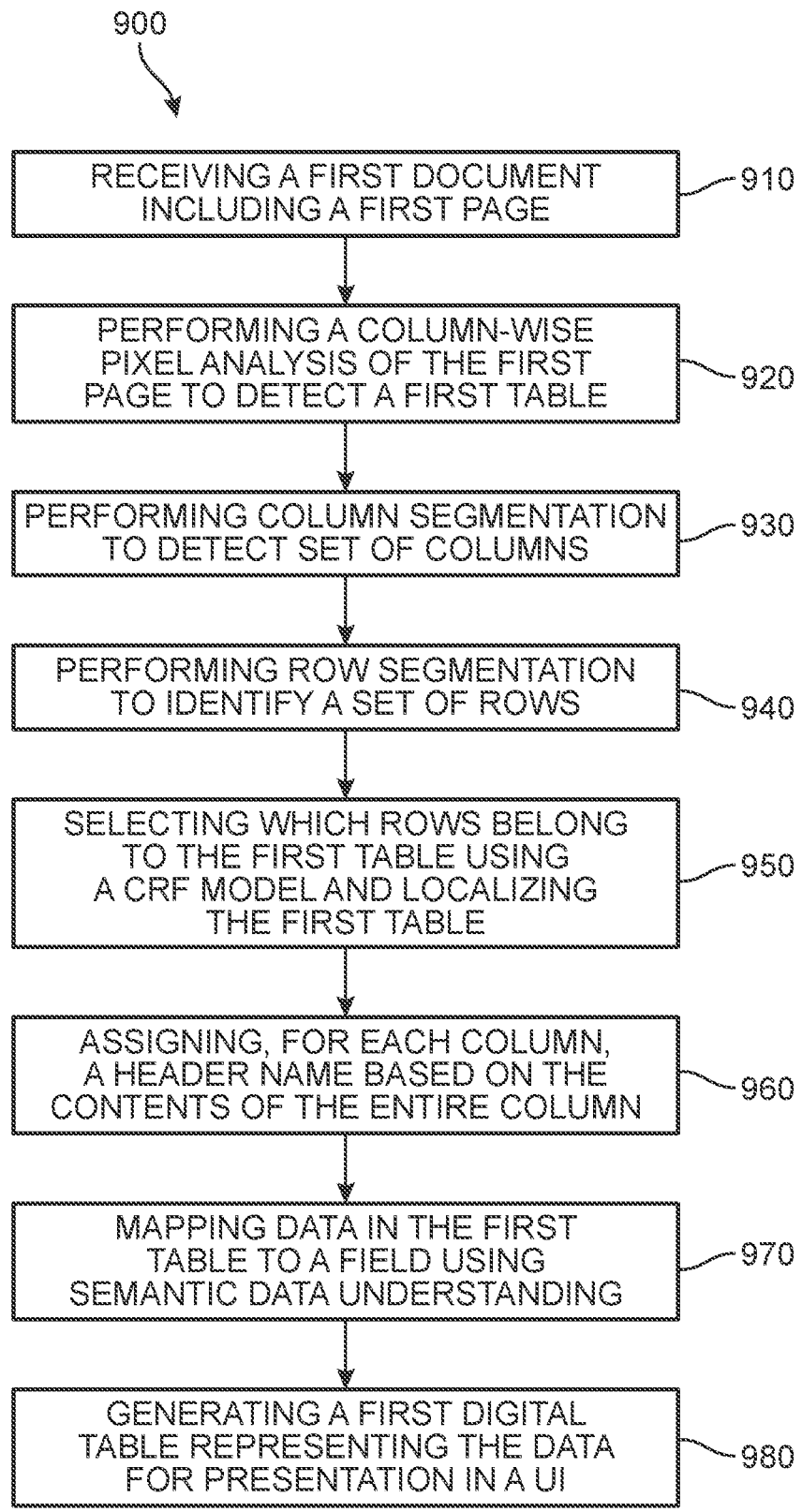
FIG. 9 is a flow chart depicting a method of tabular and list-based data extraction, according to an embodiment.

FIG. 9 is a flow chart illustrating an embodiment of a method 900 of tabular or list-based data extraction from document images. As shown in FIG. 9, a first step 910 of the method 900 includes receiving, at a server and from a first data source, a first document including a first page, and a second step 920 of performing a column-wise pixel analysis of the first page, thereby determining that the first page includes a first table. The method 900 also includes a third step 930 of performing column segmentation based on signal analysis of column-wise mean pixel values of the first page, thereby identifying a set of columns, and a fourth step 940 of performing row segmentation using optical character recognition (OCR)-generated bounding boxes, thereby identifying a set of rows. A fifth step 950 includes selecting which rows of the set of rows belong to the first table using a first Conditional Random Fields (CRF) model, thereby localizing the first table on the first page. In addition, a sixth step 960 includes selecting, for each column in the set of columns, a header name from a pre-defined set of header names, the selection being based on a classification performed by a second CRF model that evaluates at least the entire contents of that column. Furthermore, the method 900 includes a seventh step 970 of mapping each item of data extracted from a cell in the first table to a field using semantic data understanding and an eighth step 980 of generating a first digital table representing data extracted from the first table for presentation in a user interface.

In other examples, the method can also include steps of performing image binarization of the first page to produce a binarized page, where the binarized page is at a first orientation, selecting a first range of rotation including a first number of angles extending in a sequence from a first angle to a second angle, the angles in the sequence being evenly spaced apart by a first increment (e.g., 10, 5, 1, 0.5, 0.1, 0.05, 0.01, etc.), incrementally rotating the binarized page to align with each angle in the first range of rotation such that the binarized page rotates step-wise from the first orientation until oriented at a second orientation associated with the second angle, calculating, for each incremental rotation of the binarized page through the first range of rotation, a set of row-wise mean pixel values of the binarized page, thereby producing a plurality of row-wise mean pixel value sets, the plurality of row-wise mean pixel value sets including a first set of row-wise mean pixel values for the binarized page while at a third orientation associated with a third angle of the first range of rotation, generating, for each orientation of the binarized page resulting from the incremental rotation through the first range of rotation, a signal representing the set of row-wise mean pixel values of the binarized page while in that orientation, thereby producing a plurality of signals including a first signal representing the first set of row-wise mean pixel values, calculating, for each signal in the plurality of signals, a variance level of that signal, determining the first signal has the highest variance level, and selecting, for further processing, the binarized image in the third orientation based on the first signal having the highest variance level.

In another example, the method may also include steps of selecting a second range of rotation including a second number of angles extending in a sequence from a fourth angle to a fifth angle, the angles in the sequence being evenly spaced apart by a second increment that is smaller than the first increment, incrementally rotating the binarized page to align with each angle in the second range of rotation, calculating, for each incremental rotation of the binarized page through the second range of rotation, a set of row-wise mean pixel values of the binarized page, generating, for each orientation of the binarized page resulting from the incremental rotation through the second range of rotation, a signal representing the set of row-wise mean pixel values of the binarized page while in that orientation, thereby producing a plurality of signals including a second signal for the binarized page in a fourth orientation, and determining the binarized image in the fourth orientation is less skewed than the binarized image in the third orientation if a variance level for the second signal is greater than the variance level for the first signal. In some embodiments, the second range of rotation includes the third angle.

In different embodiments, the method can include steps of performing image binarization of the first page to produce a binarized page, where the binarized page is at a first orientation, calculating first row-wise mean pixel values of the binarized page while in the first orientation, generating a first signal representing the first row-wise mean pixel values, where the first signal is calculated to have a first variance level, rotating the binarized page by a first angle to produce a first rotated binarized page that is at a second orientation differing from the first orientation, calculating second row-wise mean pixel values of the first rotated binarized page, generating a second signal representing the second row-wise mean pixel values, determining the second signal is associated with a second variance level that is greater than the first variance level, determining, based on the second variance level being greater than the first variance level, that the binarized page is more skewed in the first orientation than in the second orientation. In such cases, the system can select the second orientation for the processing of the binarized page.

In some embodiments, the method also includes steps of rotating the binarized page by a second angle to produce a second rotated binarized page that is at a third orientation, calculating third row-wise mean pixel values of the second rotated binarized page, generating a third signal representing the third row-wise mean pixel values, determining the third signal is associated with a third variance level that is less than either the second variance level or first variance level, and determining, based on the third variance level being less than either the second variance level or first variance level, that the binarized page is most skewed when in the third orientation versus the first orientation and second orientation. In yet another embodiment, the method can instead include steps of rotating the binarized page by a second angle to produce a second rotated binarized page that is at a third orientation, calculating third row-wise mean pixel values of the second rotated binarized page, generating a third signal representing the third row-wise mean pixel values, determining the third signal is associated with a third variance level that is greater than either the second variance level or first variance level, and determining, based on the third variance level being greater than either the second variance level or first variance level, that the binarized page is correctly aligned when in the third orientation. The system can then begin its table analysis using the image when it is in its third orientation.

In some embodiments, the method further includes a step of classifying each row into one of three classes comprising a "header" row, a "table" row, and an "other" row. In one embodiment, a position of the first table on the first page is determined based on the classification of each row into one of the three classes. In another example, the set of columns includes a first column and a directly adjacent second column, and the method also includes steps of determining, using semantic data understanding, that first data in the first column and second data in the second column have a higher likelihood of representing meaningful (sensical, logical, normal, or expected, e.g., based on the training data or features) content when evaluated as a single data entry, and (in response to this determination) merging the first column and the second column into a single, third column that brings together the first data and second data into a single cell as a unified third content/data (e.g., such that two horizontally adjacent cells become one cell).

In one embodiment, the set of columns also includes a fourth column, and the method also includes steps of determining, using semantic data understanding, that third data in the fourth column has a higher likelihood of representing meaningful content when segmented into two separate data sets, and (in response to this determination) splitting the fourth column to produce a fifth column and a sixth column, (e.g., such that each cell in the fourth column becomes two horizontally adjacent cells). In some examples, each of the fifth column and sixth column can be understood to then include non-overlapping portions of the third data. In another example, where the set of columns includes a first column disposed between an adjacent second column and an adjacent third column, assigning a header name to the first column further includes steps of identifying a first set of features based on the contents of the first column, determining the first set of features is appropriate by reference to the contents of the second column and the third column, and classifying, based on the first set of features, the first column as falling under a first class that is selected from a set of previously defined classes, the header name being associated with the first class.

In some embodiments, the set of columns includes a first column and a directly adjacent second column, and the method also includes steps of temporarily merging the first column and the second column into a single, third column (e.g., such that two horizontally adjacent cells become one cell), determining, using semantic data understanding, that first data in the first column and second data in the second column have a higher likelihood of representing meaningful (sensical, logical, normal, or expected, e.g., based on the training data or features) content when evaluated as two separate data entries, and (in response to this determination) splitting the third column and reverting to the first column and the second column that segments the first data and the second data (e.g., such that the merged cell reverts to two horizontally adjacent but separate cells).

In some embodiments, the set of columns includes a first column disposed between an adjacent second column and an adjacent third column, and assigning a header name to the first column further includes steps of identifying a first set of features based on the contents of the first column, determining the first set of features is appropriate by reference to the contents of the second column and the third column, and classifying, based on the first set of features, the first column as falling under a first class that is selected from a set of previously defined classes, the header name being associated with the first class.

Figure 10:
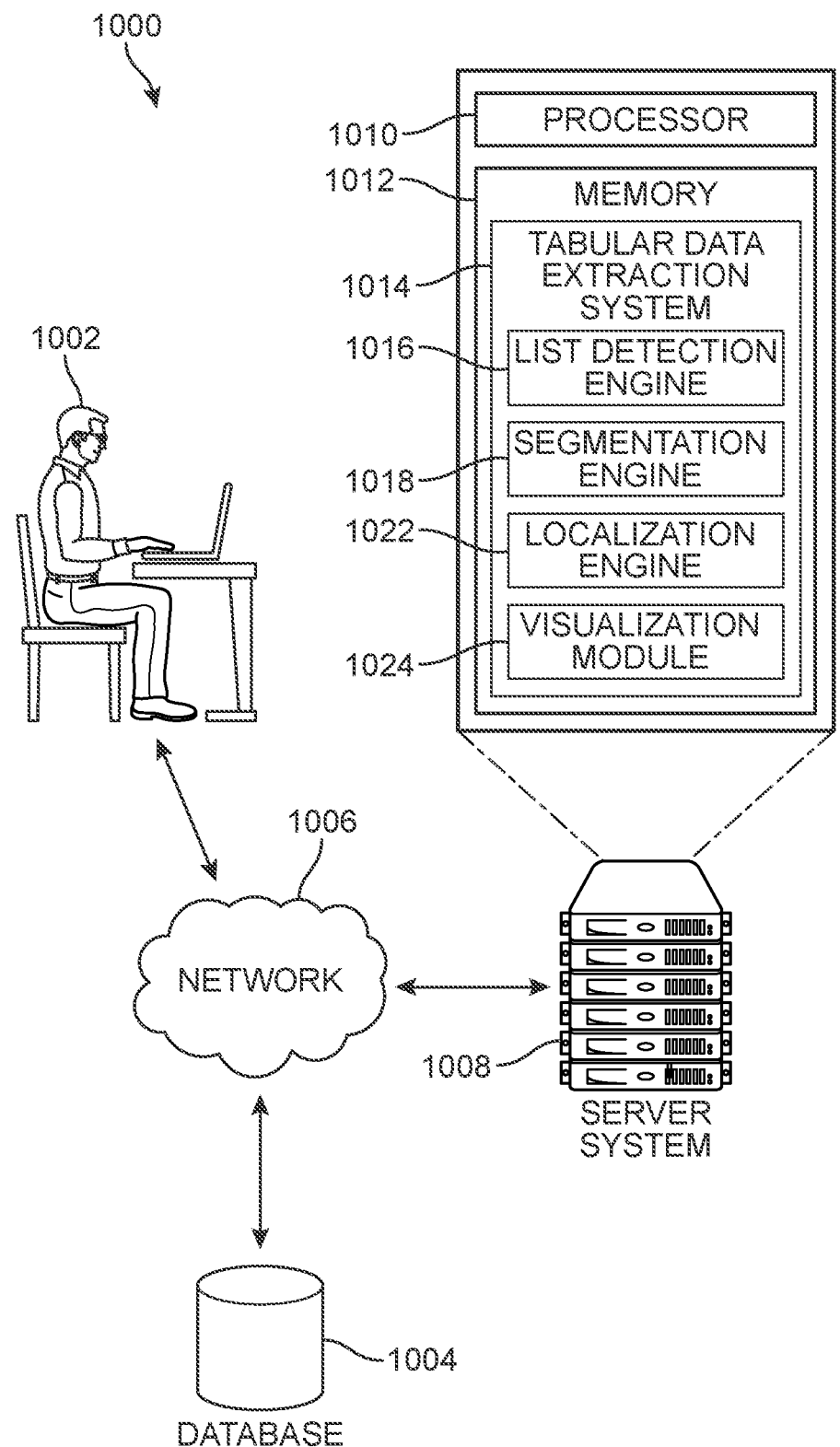
FIG. 10 is a diagram depicting example environments and components by which systems and/or methods, described herein, may be implemented.

FIG. 10 is a schematic diagram of an environment 1000 for a document reader and data extraction system 1014 (or system 1014), according to an embodiment. The environment 1000 may include a plurality of components capable of performing the disclosed method of table or list recognition, row and column segmentation, table localization, and data mapping and visualization. For example, environment 1000 includes a user device 1002, a computing/server system 1008, and a database 1004. The components of environment 1000 can communicate with each other through a network 1006. For example, user device 1002 may retrieve information from database 1004 via network 1006. In some embodiments, network 1006 may be a wide area network ("WAN"), e.g., the Internet. In other embodiments, network 1006 may be a local area network ("LAN").

As shown in FIG. 10, components of the system 1014 may be hosted in computing system 1008, which may have a memory 1012 and a processor 1010. Processor 1010 may include a single device processor located on a single device, or it may include multiple device processors located on one or more physical devices. Memory 1012 may include any type of storage, which may be physically located on one physical device, or on multiple physical devices. In some cases, computing system 1008 may comprise one or more servers that are used to host the system.

While FIG. 10 shows one user device, it is understood that one or more user devices may be used. For example, in some embodiments, the system may include two or three user devices. In some embodiments, the user device may be a computing device used by a user. For example, user device 1002 may include a smartphone or a tablet computer. In other examples, user device 1002 may include a laptop computer, a desktop computer, and/or another type of computing device. The user devices may be used for inputting, processing, and displaying information. Referring to FIG. 10, environment 1000 may further include database 1004, which stores test data, training data, and/or other related data the data extraction system as well as other external components. This data may be retrieved by other components for system 1014. As discussed above, system 1014 may include a list detection engine 1016, a segmentation engine 1018, a localization engine 1022, and a visualization engine 1024. Each of these components may be used to perform the operations described herein.

To provide further context, in some embodiments, some of the processes described herein can be understood to operate in a system architecture that can include a plurality of virtual local area network (VLAN) workstations at different locations that communicate with a main data center with dedicated virtual servers such as a web server for user interfaces, an app server for OCR and data processing, a database for data storage, etc. As a general matter, a virtual server is a type of virtual machine (VM) that is executed on a hardware component (e.g., server). In some examples, multiple VMs can be deployed on one or more servers.

In different embodiments, the system may be hosted at least in part in a cloud computing environment offering ready scalability and security. The cloud computing environment can include, for example, an environment that hosts the document processing management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource"). It is contemplated that implementations of the present disclosure can be realized with appropriate cloud providers (e.g., AWS provided by Amazon™, GCP provided by Google™, Azure provided by Microsoft™, etc.).

In different embodiments, applications of the system are built and deployed by a software framework. A software framework is a universal, reusable software environment that provides particular functionality as part of a larger software platform to facilitate development of software applications. Software frameworks may include support programs, compilers, code libraries, tool sets, and application programming interfaces (APIs) that enable development of a software application. Some implementations can provide a user device and/or component management platform that is capable of facilitating the development of software applications through the use of a user interface designed to be simple to use, and re-usable software components (e.g., buttons, links, fields, graphics, and/or the like)

that can be displayed in the user interface and generated in multiple different software frameworks and/or programming languages for a variety of platforms. For example, the component management platform may provide a first software application that includes a user interface through which a user can develop a second software application. The user may use features of the user interface to create software components that are displayed in the first software application (e.g., the UI) using a first programming language (e.g., hypertext markup language (HTML) or another programming language associated with the first software application) and generated in a first software framework (e.g., a software framework associated with the software application being developed). The user interface may include features, such as drag and drop operations for the creation of software components and selectable software component characteristics, to facilitate creation and customization of software components. In some implementations, the component management platform may store components that were previously generated by users, generate copies of software components in multiple software frameworks and/or for different platforms, and make software components available for users to include in software applications that are under development.

In this way, a user device and/or cloud server may facilitate the development of software applications in multiple software frameworks and for multiple platforms, without requiring special knowledge or repeated component development on the part of a user, and in a manner designed to be relatively quick and efficient. Special software framework knowledge and/or familiarity may not be required, for example, by using a user interface to enable the generation of software components in multiple software frameworks in a single integrated development environment, such as a web-based integrated development environment that is accessible from any device with a web browsing application browser. Some non-limiting examples of such frameworks include Microsoft.NET™, the EMC™ integrated development environment, the Microsoft™ Visual Studios integrated development environment for writing and debugging code, and the Eclipse™ integrated development environment for incorporation of open source code. Reusable software components may significantly increase the speed and efficiency of software development, including facilitating more efficient use of software developer time and computing resources (e.g., processor resources, memory resources, and/or the like). Some implementations may reduce network communications relative to a purely cloud-based application development solution, e.g., by enabling the user device to perform much of the functionality for component and software application development without the need to interact with a server computer over a network, which would introduce latency into the development process. Furthermore, some implementations described herein use a rigorous, computerized process to perform tasks or roles that were not previously performed. Also, automating the process for generating software components conserves computing resources (e.g., processor resources, memory resources, and/or the like) and time that would otherwise be wasted by using manual development processes for attempting to create multiple software components in multiple software frameworks.

In some embodiments, the software development application may be an application installed on and executed by the user device. In some implementations, the software development application may be a web-based application designed to execute a web application (e.g., an application operating on a server computer or the component management platform, and implemented in HTML, JavaScript, and/or the like). The software development application may be written in a variety of programming languages and provide a variety of different types of user interface elements, which may be used in the development of a new software component and/or another software application. In some embodiments, the software development application includes a component toolbox. The component toolbox may be presented via a user interface offering one or more interactable user interface elements, such as buttons, which are associated with software components. For example, the component toolbox may include one or more buttons for the generation of software components, such as input components (e.g., buttons, checkboxes, dropdown lists, toggle buttons, text fields, and/or the like), navigational components (e.g., search fields, sliders, pagination indicators, links, icons, and/or the like), informational components (e.g., tooltips, progress bars, message boxes, images, and/or the like), and/or the like. In some implementations, the component toolbox may include user interface elements that generate a software component based on a pre-existing software component (e.g., a previously created software component). In some implementations, the component toolbox may include a user interface element designed to enable the creation of a new software component, which may enable a user of the user device to define a new type of software component.

For purposes of this disclosure, the Application Programming Interfaces (APIs) may refer to computer code that supports application access to operating system functionality. A platform dependent API may be understood to rely on the functionality of a particular software platform. The platform dependent API may use device specific libraries or native code allowing access to the mobile device at a low level. The API can be configured to provide a wide range of visualization dashboards for document processing management, as will be discussed below.

Furthermore, as noted earlier, the system can incorporate a specialized optical character recognition (OCR) engine to aid in data extraction. In some implementations, the OCR engine may include an OmniPage® OCR engine, a Google® Cloud Vision API OCR engine, Microsoft® Azure Computer Vision API OCR engine, an IBM® Bluemix OCR engine, and/or the like. In some implementations, the OCR engine may convert the documents into an electronic format (e.g., the digitized documents). Optical character recognition involves a conversion of images of typed, handwritten, or printed text into machine-encoded text. For example, OCR may be applied to a scanned document, a photo of a document, a photo of a scene that includes text, and/or the like, to produce electronic data (e.g., text data). OCR can be used as a form of information entry from printed paper data records (e.g., printed forms, printed tables, printed reports, identification documents, invoices, bank statements, and/or the like). Converting printed text to electronic data allows the information represented by the printed text to be electronically edited, searched, stored more compactly, displayed online, and/or used in machine processes such as cognitive computing, machine translation, (extracted) text-to-speech, key data and text mining, and/or the like. Implementations of OCR may employ pattern recognition, artificial intelligence, computer vision, and/or the like. Content clustering, whereby content of OCR-ed source documents is parsed and chunks are identified, can be performed next. Each chunk will contain text and location. In addition, an Inter Chunk Distance (ICD) is calculated using a custom distance function for all chunks to form an ICD Matrix. An Epsilon value, required for DBSCAN (Density-Based Spatial Clustering of Applications with Noise) is calculated based on the distance matrix, and the chunks are then clustered with the modified DBSCAN-based clustering algorithm to find text groups/phrases and paragraphs.

The generated map and values of common and/or related fields can be used to train a neural network model for identifying the map best suited for a document field. The trained model can then be used to identify the best map for fields and perform the data extraction. Thus, during extraction, the values of related fields can be used along with the trained model to identify the map. The identified map can then be used to extract the field. The extractor can use Levenshtein Distance for locating text without an exact match in the document. In some embodiments, a machine learning model is used to detect data included in the digitized documents, including but not limited to a Google™ API machine learning model, a Microsoft™ Azure API machine learning model, an IBM™ Bluemix API machine learning model, a classifier machine learning model, etc. In some embodiments, the system may perform a training operation on the machine learning model with the digitized documents or with information that includes different inputs. For example, the system may separate the digitized documents into a training set, a validation set, a test set, and so forth. In some implementations, the system may train the machine learning model using, for example, an unsupervised training procedure and based on the training set of the digitized documents. For example, the system may perform dimensionality reduction to reduce the digitized documents to a minimum feature set, thereby reducing resources (e.g., processing resources, memory resources, and/or the like) to train the machine learning model, and may apply a classification technique to the minimum feature set. Additionally, or alternatively, the system may use a support vector machine (SVM) classifier technique to generate a non-linear boundary between data points in the training set. In this case, the non-linear boundary is used to classify test data into a particular class.

Additionally, or alternatively, the system may train the machine learning model using a supervised training procedure that includes receiving input to the machine learning model from a subject matter expert or other operator, which may reduce an amount of time, an amount of processing resources, and/or the like to train the machine learning model of activity automatability relative to an unsupervised training procedure. In some embodiments, the system may use one or more other model training techniques, such as a neural network technique, a latent semantic indexing technique, and/or the like. For example, the system may perform an artificial neural network processing technique (e.g., using a two-layer feedforward neural network architecture, a three-layer feedforward neural network architecture, and/or the like) to perform pattern recognition with regard to patterns of whether a document includes a particular response type or input value. In this case, using the artificial neural network processing technique may improve an accuracy of the trained machine learning model generated by the system by being more robust to noisy, imprecise, or incomplete data, and by enabling the electronic document platform to detect patterns and/or trends undetectable to human analysts or systems using less complex techniques. In some embodiments, the machine learning model may include a support vector machine model, a linear regression model, a logistic regression model, a naive Bayes model, a linear discriminant analysis model, a decision tree model, a k-nearest neighbor model, a neural network model, and/or the like.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment 222, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

An "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In addition to the algorithms and techniques described above, one or more of the following techniques may be utilized by one or more of the disclosed embodiments: RPA, Mongo DB, Artificial Intelligence (AI) Modules such as Python, Image to Text, OCR, Computer Vision, Image comparison (phase comparison), Image Validation (image to text, then text to text comparison), Learning Algorithms, Similarity Analytics, Sequencing algorithms, Random Forest, graph Convolutional Neural Networks (gCNN), Data Clustering with weighted data, Data Visualization, Rocket Chat, and D3JS.

For purposes of the current description, the terms "organization," "client," "organization resources," or "client resources" refer to database resources (i.e., data, metadata, programs, and other resources) that are maintained in a central multi-tenant database for access by users who have appropriate access privileges. Such resources will generally be managed by a server and data storage system maintained by a platform provider, as opposed to computers within the actual client (tenant) businesses themselves. In addition, a Cloud Service Provider (CSP) may include an organization that provides a cloud computing resource to a client device and/or a user of a client device. Furthermore, the term "component" refers to software applications and other system modules and features comprising or supporting the multi-tenant architecture.

In one implementation, the systems described herein include hardware data storage. Among other operational data, the hardware data storage may store instantiation rules and instantiation metadata. Instantiation circuitry interprets the requirement syntax and executes the instantiation rules with input from the instantiation metadata to issue infrastructure instantiation requests to cause instantiation of the resources requested by the developers. Further, state file unification circuitry facilitates developer collaboration by receiving and managing state files for the individual developer projects. In addition, in some embodiments, the systems described herein includes a validation circuitry. The validation circuitry helps to ensure that the instantiation requests that the systems described herein makes to the infrastructure providers are completed correctly, cause the expected infrastructure results, and that the infrastructure remains correct over time. To that end, the validation circuitry issues validation requests to the infrastructure providers. The infrastructure providers return ICV messages to the systems described herein. Examples of ICV messages include responses to validation requests, responses to instantiation requests, and infrastructure status messages.

The instantiation circuitry, state file unification circuitry, validation circuitry, requests, and other features of the systems described herein improve the operation and function of the underlying computer hardware itself. That is, these features (among others described) are specific improvements in way that the underlying computer system operates and solve technical challenges with infrastructure instantiation and validation, as well as developer collaborating in serverless execution environments. The improvements facilitate more efficient, accurate, consistent, and precise building of resources that will operate properly in serverless function environments. The improved functioning of the underlying computer hardware itself achieves further technical benefits. In addition, the systems described herein provides additional abstraction, so that developers need not be complete experts in complex IaC syntaxes. The developers may instead concentrate on the particular goals of their projects with less time and energy spent on mastering intricate IaC coding.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways.

Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of tabular or list-based data extraction from document images, the method comprising:
    receiving, at a server and from a first data source, a first document including a first page;
    performing a column-wise pixel analysis of the first page, thereby determining that the first page includes a first table;
    performing column segmentation based on signal analysis of column-wise mean pixel values of the first page, thereby identifying a set of columns;
    performing row segmentation using optical character recognition (OCR)-generated bounding boxes, thereby identifying a set of rows;
    selecting which rows of the set of rows belong to the first table using a first Conditional Random Fields (CRF) model, thereby localizing the first table on the first page;
    selecting, for each column in the set of columns, a header name from a pre-defined set of header names, the selection being based on a classification performed by a second CRF model that evaluates at least the entire contents of that column;
    mapping each item of data extracted from a cell in the first table to a field using semantic data understanding; and
    generating a first digital table representing data extracted from the first table for presentation in a user interface.

2. The method of claim 1, further comprising:
    performing image binarization of the first page to produce a binarized page, where the binarized page is at a first orientation;
    selecting a first range of rotation including a first number of angles extending in a sequence from a first angle to a second angle, the angles in the sequence being evenly spaced apart by a first increment;
    incrementally rotating the binarized page to align with each angle in the first range of rotation such that the binarized page rotates step-wise from the first orientation until oriented at a second orientation associated with the second angle;
    calculating, for each incremental rotation of the binarized page through the first range of rotation, a set of row-wise mean pixel values of the binarized page, thereby producing a plurality of row-wise mean pixel value sets, the plurality of row-wise mean pixel value sets including a first set of row-wise mean pixel values for the binarized page while at a third orientation associated with a third angle of the first range of rotation;
    generating, for each orientation of the binarized page resulting from the incremental rotation through the first range of rotation, a signal representing the set of row-wise mean pixel values of the binarized page while in that orientation, thereby producing a plurality of signals that includes a first signal representing the first set of row-wise mean pixel values;
    calculating, for each signal in the plurality of signals, a variance level of that signal;
    determining the first signal has the highest variance level; and
    selecting, for further processing, the binarized image in the third orientation based on the first signal having the highest variance level.

3. The method of claim 2, further comprising:
    selecting a second range of rotation including a second number of angles extending in a sequence from a fourth angle to a fifth angle, the angles in the sequence being evenly spaced apart by a second increment that is smaller than the first increment;
    incrementally rotating the binarized page to align with each angle in the second range of rotation;
    calculating, for each incremental rotation of the binarized page through the second range of rotation, a set of row-wise mean pixel values of the binarized page;
    generating, for each orientation of the binarized page resulting from the incremental rotation through the second range of rotation, a signal representing the set of row-wise mean pixel values of the binarized page while in that orientation, thereby producing a plurality of signals that includes a second signal for the binarized page in a fourth orientation; and
    determining the binarized image in the fourth orientation is less skewed than the binarized image in the third orientation if a variance level for the second signal is greater than the variance level for the first signal.

4. The method of claim 3, wherein the second range of rotation includes the third angle.

5. The method of claim 2, further comprising employing a minmax-concave total variation denoising technique to smooth the first signal.

6. The method of claim 1, further comprising classifying each row into one of three classes comprising a header row, a table row, and an other row, and wherein a position of the first table on the first page is determined based on the classification of each row into one of the three classes.

7. The method of claim 1, wherein the set of columns includes a first column and a directly adjacent second column, and the method further comprises:
    determining, using semantic data understanding, that first data in the first column and second data in the second column have a higher likelihood of representing meaningful content when evaluated as a single data entry; and
    merging the first column and the second column into a single, third column.

8. The method of claim 1, wherein the set of columns includes a first column disposed between an adjacent second column and an adjacent third column, and selecting a header name for the first column further comprises:
    identifying a first set of features based on the contents of the first column;
    determining the first set of features is appropriate by reference to the contents of the second column and the third column; and
    classifying, using the second CRF model and based on the first set of features, the first column as falling under a first class that is selected from a set of previously defined classes, the header name being associated with the first class.

9. A system for tabular or list-based data extraction from document images, the system comprising:
    a processor;
    machine-readable media including instructions which, when executed by the processor, cause the processor to:
        receive, at a server and from a first data source, a first document including a first page;

perform a column-wise pixel analysis of the first page, thereby determining that the first page includes a first table;

perform column segmentation based on signal analysis of column-wise mean pixel values of the first page, thereby identifying a set of columns;

perform row segmentation using optical character recognition (OCR)-generated bounding boxes, thereby identifying a set of rows;

select which rows of the set of rows belong to the first table using a first Conditional Random Fields (CRF) model, thereby localizing the first table on the first page;

select, for each column in the set of columns, a header name from a pre-defined set of header names, the selection being based on a classification performed by a second CRF model that evaluates at least the entire contents of that column;

map each item of data extracted from a cell in the first table to a field using semantic data understanding; and generate a first digital table representing data extracted from the first table for presentation in a user interface.

10. The system of claim 9, wherein the instructions further cause the processor to:

perform image binarization of the first page to produce a binarized page, where the binarized page is at a first orientation;

select a first range of rotation including a first number of angles extending in a sequence from a first angle to a second angle, the angles in the sequence being evenly spaced apart by a first increment;

incrementally rotate the binarized page to align with each angle in the first range of rotation such that the binarized page rotates step-wise from the first orientation until oriented at a second orientation associated with the second angle;

calculate, for each incremental rotation of the binarized page through the first range of rotation, a set of row-wise mean pixel values of the binarized page, thereby producing a plurality of row-wise mean pixel value sets, the plurality of row-wise mean pixel value sets including a first set of row-wise mean pixel values for the binarized page while at a third orientation associated with a third angle of the first range of rotation;

generate, for each orientation of the binarized page resulting from the incremental rotation through the first range of rotation, a signal representing the set of row-wise mean pixel values of the binarized page while in that orientation, thereby producing a plurality of signals that includes a first signal representing the first set of row-wise mean pixel values;

calculate, for each signal in the plurality of signals, a variance level of that signal;

determine the first signal has the highest variance level; and select, for further processing, the binarized image in the third orientation based on the first signal having the highest variance level.

11. The system of claim 10, wherein the instructions further cause the processor to:

select a second range of rotation including a second number of angles extending in a sequence from a fourth angle to a fifth angle, the angles in the sequence being evenly spaced apart by a second increment that is smaller than the first increment;

incrementally rotate the binarized page to align with each angle in the second range of rotation;

calculate, for each incremental rotation of the binarized page through the second range of rotation, a set of row-wise mean pixel values of the binarized page;

generate, for each orientation of the binarized page resulting from the incremental rotation through the second range of rotation, a signal representing the set of row-wise mean pixel values of the binarized page while in that orientation, thereby producing a plurality of signals that includes a second signal for the binarized page in a fourth orientation; and determine the binarized image in the fourth orientation is less skewed than the binarized image in the third orientation if a variance level for the second signal is greater than the variance level for the first signal.

12. The system of claim 10, wherein the second range of rotation includes the third angle.

13. The system of claim 10, wherein the instructions further cause the processor to employ a minmax-concave total variation denoising technique to smooth the first signal.

14. The system of claim 9, wherein the instructions further cause the processor to classify each row into one of three classes comprising a header row, a table row, and an other row, and a position of the first table on the first page is determined based on the classification of each row into one of the three classes.

15. The system of claim 9, wherein the set of columns includes a first column and a directly adjacent second column, and the instructions further cause the processor to:

determine, using semantic data understanding, that first data in the first column and second data in the second column have a higher likelihood of representing meaningful content when evaluated as a single data entry; and merge the first column and the second column into a single, third column.

16. The system of claim 9, wherein the set of columns includes a first column disposed between an adjacent second column and an adjacent third column, and the instructions further cause the processor to:

identify a first set of features based on the contents of the first column, determine whether the first set of features is appropriate by reference to the contents of the second column and the third column; and classify, using the second CRF model and based on the first set of features, the first column as falling under a first class that is selected from a set of previously defined classes, the header name being associated with the first class.

17. A system comprising one or more computers and one or more storage devices storing instructions that are operable, when executed by the one or more computers, to cause the one or more computers to:

receive, at a server and from a first data source, a first document including a first page;

perform a column-wise pixel analysis of the first page, thereby determining that the first page includes a first table;

perform column segmentation based on signal analysis of column-wise mean pixel values of the first page, thereby identifying a set of columns;

perform row segmentation using optical character recognition (OCR)-generated bounding boxes, thereby identifying a set of rows;

select which rows of the set of rows belong to the first table using a first Conditional Random Fields (CRF) model, thereby localizing the first table on the first page;

select, for each column in the set of columns, a header name from a pre-defined set of header names, the selection being based on a classification performed by a second CRF model that evaluates at least the entire contents of that column;

map each item of data extracted from a cell in the first table to a field using semantic data understanding; and generate a first digital table representing data extracted from the first table for presentation in a user interface.

18. The system of claim 17, wherein the instructions further cause the one or more computers to:

perform image binarization of the first page to produce a binarized page, where the binarized page is at a first orientation;

select a first range of rotation including a first number of angles extending in a sequence from a first angle to a second angle, the angles in the sequence being evenly spaced apart by a first increment;

incrementally rotate the binarized page to align with each angle in the first range of rotation such that the binarized page rotates step-wise from the first orientation until oriented at a second orientation associated with the second angle;

calculate, for each incremental rotation of the binarized page through the first range of rotation, a set of row-wise mean pixel values of the binarized page, thereby producing a plurality of row-wise mean pixel value sets, the plurality of row-wise mean pixel value sets including a first set of row-wise mean pixel values for the binarized page while at a third orientation associated with a third angle of the first range of rotation;

generate, for each orientation of the binarized page resulting from the incremental rotation through the first range of rotation, a signal representing the set of row-wise mean pixel values of the binarized page while in that orientation, thereby producing a plurality of signals that includes a first signal representing the first set of row-wise mean pixel values;

calculate, for each signal in the plurality of signals, a variance level of that signal;

determine the first signal has the highest variance level; and select, for further processing, the binarized image in the third orientation based on the first signal having the highest variance level.

19. The system of claim 18, wherein the instructions further cause the processor to:

select a second range of rotation including a second number of angles extending in a sequence from a fourth angle to a fifth angle, the angles in the sequence being evenly spaced apart by a second increment that is smaller than the first increment;

incrementally rotate the binarized page to align with each angle in the second range of rotation;

calculate, for each incremental rotation of the binarized page through the second range of rotation, a set of row-wise mean pixel values of the binarized page;

generate, for each orientation of the binarized page resulting from the incremental rotation through the second range of rotation, a signal representing the set of row-wise mean pixel values of the binarized page while in that orientation, thereby producing a plurality of signals that includes a second signal for the binarized page in a fourth orientation; and determine the binarized image in the fourth orientation is less skewed than the binarized image in the third orientation if a variance level for the second signal is greater than the variance level for the first signal.

20. The system of claim 17, wherein the set of columns includes a first column disposed between an adjacent second column and an adjacent third column, and the instructions further cause the processor to:

identify a first set of features based on the contents of the first column, determine whether the first set of features is appropriate by reference to the contents of the second column and the third column; and classify, using the second CRF model and based on the first set of features, the first column as falling under a first class that is selected from a set of previously defined classes, the header name being associated with the first class.

* * * * *